US009195314B2

(12) United States Patent
Sharma et al.

(10) Patent No.: US 9,195,314 B2
(45) Date of Patent: Nov. 24, 2015

(54) KEYBOARD WITH MAGNETIC KEY POSITION RETURN FOR AN ELECTRONIC DEVICE

(71) Applicant: Intel Corporation, Santa Clara, CA (US)

(72) Inventors: Sameer Sharma, Santa Clara, CA (US); Douglas Satzger, Santa Clara, CA (US); Gadi Amit, San Francisco, CA (US); Yoshikazu Hoshino, San Francisco, CA (US); Chadwick Harber, San Francisco, CA (US); Phil Houdek, San Francisco, CA (US); Stanislav Moiseyenko, Mountain View, CA (US); Daniel Clifton, San Francisco, CA (US); Nathan Jauvtis, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 3 days.

(21) Appl. No.: 13/719,307

(22) Filed: Dec. 19, 2012

(65) Prior Publication Data

US 2014/0169853 A1    Jun. 19, 2014

(51) Int. Cl.
*G06F 3/02* (2006.01)
*G06F 1/16* (2006.01)
*H01H 13/85* (2006.01)

(52) U.S. Cl.
CPC ............ *G06F 3/0202* (2013.01); *G06F 1/1662* (2013.01); *H01H 13/85* (2013.01); *H01H 2221/04* (2013.01); *H01H 2221/058* (2013.01); *H01H 2227/036* (2013.01)

(58) Field of Classification Search
CPC ...... H01H 2235/042; H01H 1/54; H01H 5/02; H01H 37/66; H01H 13/704; H01H 13/86; H01H 2221/04; H01H 13/85; G06F 3/0202; G06F 1/1662
USPC .................. 200/404; 400/472, 480, 481, 490
See application file for complete search history.

(56) References Cited

U.S. PATENT DOCUMENTS

| 5,977,888 | A | * | 11/1999 | Fujita et al. .................... 341/34 |
| 6,670,873 | B2 | * | 12/2003 | Inada et al. ................... 335/205 |
| 2008/0159799 | A1 | * | 7/2008 | Bender et al. ................ 400/472 |
| 2009/0135554 | A1 | | 5/2009 | Chien et al. |

(Continued)

FOREIGN PATENT DOCUMENTS

| JP | 08315670 | A | * | 11/1996 | ............. H01H 13/02 |
| JP | 09007450 | A | * | 1/1997 | ............. H01H 13/02 |
| JP | 09259701 | A | * | 10/1997 | ............. H01H 21/36 |
| JP | 2011113248 | A | * | 6/2011 | ................ G06F 3/02 |
| WO | WO 2014/099020 | A1 | | 6/2014 | |

OTHER PUBLICATIONS

International Search Report and Written Opinion received for PCT Patent Application No. PCT/US2013/048281, mailed on Oct. 23, 2013, 13 pages.

(Continued)

*Primary Examiner* — Daniel J Colilla
(74) *Attorney, Agent, or Firm* — Patent Capital Group

(57) ABSTRACT

Particular embodiments described herein provide for a keyboard assembly having a plurality of keys that include a key having one or more magnets, which are provided at a substantially outer portion of the key. The keyboard assembly can also include a top plate that comprises a ferrous material to attract the one or more magnets to the top plate.

38 Claims, 31 Drawing Sheets

(56) References Cited

U.S. PATENT DOCUMENTS

| | | |
|---|---|---|
| 2010/0149761 A1* | 6/2010 | Osborne et al. .............. 361/748 |
| 2010/0219058 A1 | 9/2010 | Yang |
| 2011/0278146 A1* | 11/2011 | Zheng et al. .................. 200/5 A |
| 2012/0050972 A1 | 3/2012 | Ho |
| 2012/0092263 A1 | 4/2012 | Peterson et al. |
| 2012/0268384 A1 | 10/2012 | Peterson et al. |
| 2013/0126323 A1* | 5/2013 | Hsu et al. ...................... 200/341 |

OTHER PUBLICATIONS

Feb. 16, 2015 Search Report of R.O.C. Patent Application No. 102142980, English translation, 2 pages.

International Preliminary Report on Patentability in International Application No. PCT/US2013/048281, mailed Jul. 2, 2015, 12 pages.

* cited by examiner

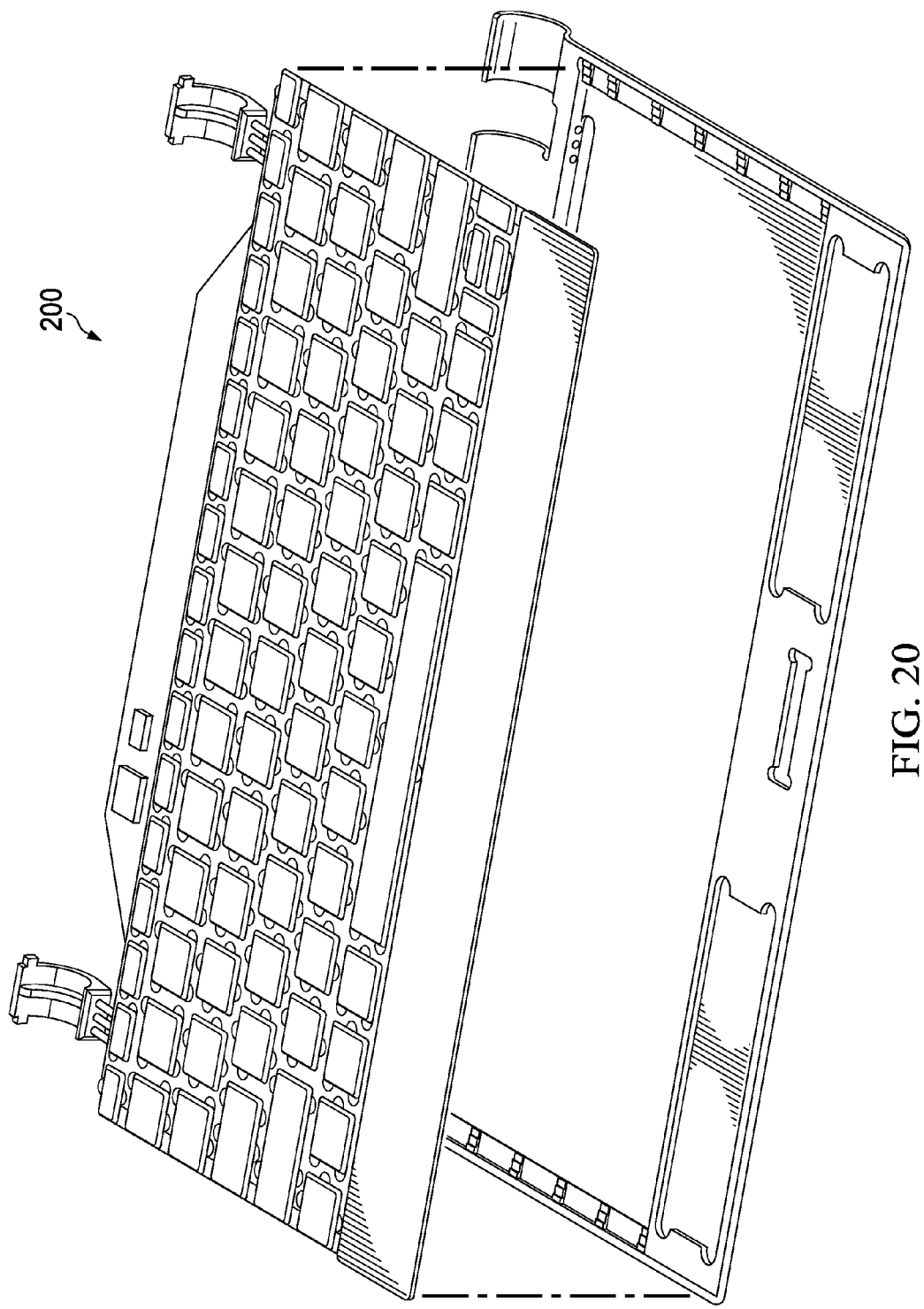

KEYBOARD WITH MAGNETIC KEY POSITION RETURN FOR AN ELECTRONIC DEVICE

TECHNICAL FIELD

Embodiments described herein generally relate to a keyboard for an electronic device.

BRIEF DESCRIPTION OF THE DRAWINGS

Embodiments are illustrated by way of example and not by way of limitation in the FIGURES of the accompanying drawings, in which like references indicate similar elements and in which:

FIGS. 13-20 are simplified schematic diagrams illustrating certain keyboard assembly components associated with the electronic device;

Figure 1A:
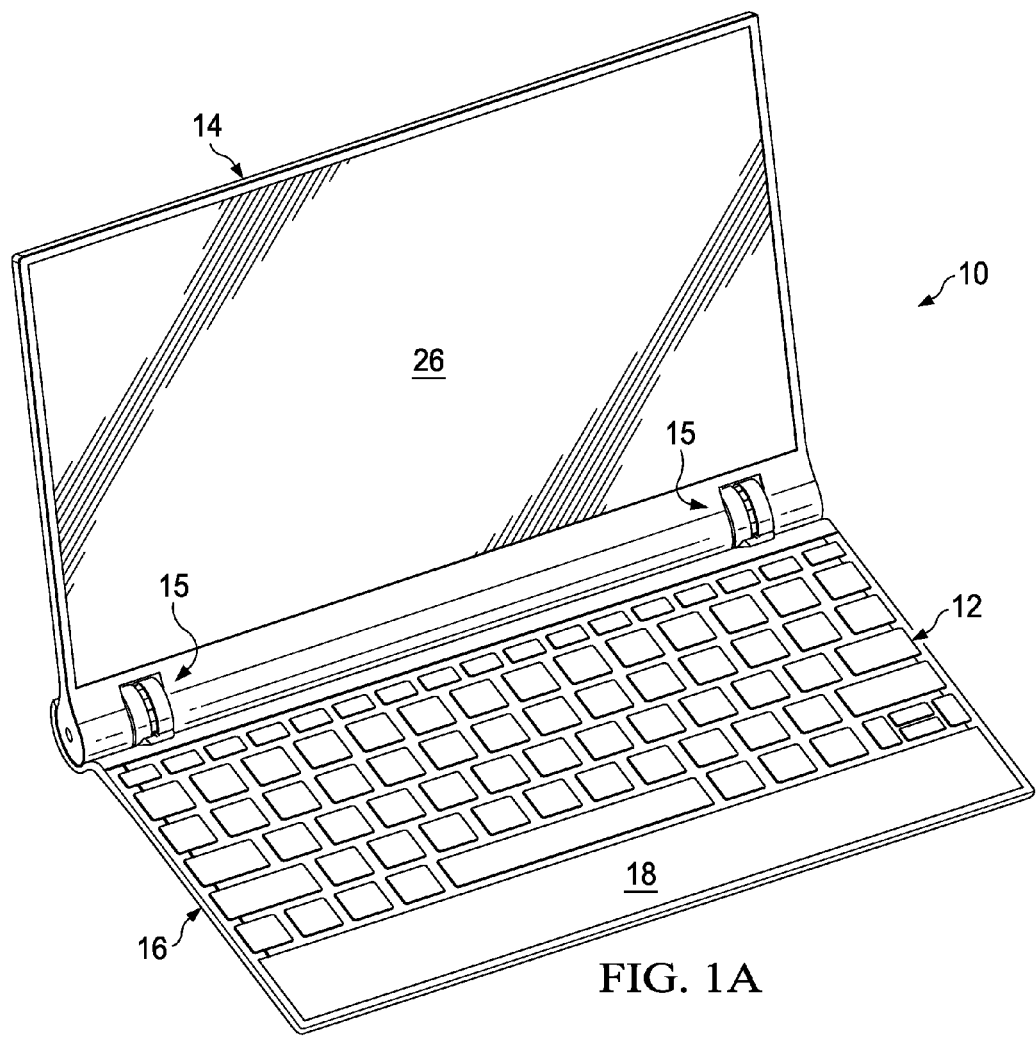
FIG. 1A is a simplified schematic diagram illustrating an embodiment of an electronic device in an open configuration with an attached keyboard, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to keyboard configurations for an electronic device. Features such as structure(s), function(s), and/or characteristic(s), for example, are described with reference to one embodiment as a matter of convenience; various embodiments may be implemented with any suitable one or more of the described features.

Traditionally, keyboard configurations for tablets fail to offer an acceptable user experience. Typing on glass is ergonomically uncomfortable and, furthermore, Bluetooth keyboards are thick and cumbersome for carrying from place to place. Those keyboard designs stifle the user's flexibility, along with hindering the overall consumer experience of the associated electronic device (e.g., during laptop usage).

Particular embodiments described herein provide for a keyboard assembly having a plurality of keys that include a key having one or more magnets, which are provided at a substantially outer portion of the key. The keyboard assembly can also include a top plate that comprises a ferrous material to attract the one or more magnets to the top plate.

In other embodiments, the keyboard assembly may include a web structure coupled to the top plate, where the web structure is to guide vertical movement for the plurality of keys, and where the web structure is to prevent rotational movement for the plurality of keys. Additionally, in certain implementations, the web structure comprises nonferrous material. Hence, the keyboard assembly can include a nonferrous web that provides sufficient stiffness to the keyboard body. In certain cases, the top plate is to be provided above sides of the certain keys. In particular implementations, at least some of the plurality of keys are biased upward with one or more electrically conductive pads.

In yet other embodiments, the web structure defines a number of openings through which movement of the plurality of the keys is constrained. Additionally, the keyboard assembly may include a keyboard housing coupled to the web structure. The keyboard body may comprise a laminate construction in which a metal material is integrated into a plastic material. In addition, the keyboard assembly can be configured to provide a keypress response (i.e., a keystroke) that is to confirm a depression of a particular one of the plurality of keys. The plurality of keys may include one or more arrow keys that are to pivot about an axis in response to a depression force being applied to the one or more arrow keys. The plurality of keys may include one or more edge keys provided along at least a section of a perimeter of the keyboard assembly. At least some of the one or more edge keys may extend over an edge of a support base of the keyboard assembly.

Certain magnets can be suitably positioned to minimize a toggling effect. For example, a toggle key configuration can be used with the arrow keys in certain keyboard layouts, where it is desirable to achieve the toggle effect such that at least two of the magnets hold in response to a depression force.

In yet other embodiments, the keyboard assembly may include a battery storage unit that is to receive a battery for providing a backup power supply to an electronic device to which the keyboard assembly is attached. In certain cases, electrical contact is to be registered for a keypress for a particular key in response to a depression force of at least 70 grams being applied to the particular key. Additionally, in certain example implementations, the magnets are to create a magnetic force toward the top plate such that a particular key is returned to its original position after a keypress.

In at least one example, once the tactile point is reached, the force drops and the key moves until the electric contact is made (i.e., the operating point). Hence, as the keypress force increases to the point of overcoming the magnetic attraction, the key is pushed away from the top plate and the magnetic attraction drops off significantly. In at least one embodiment, the keys are substantially stationary until the tactile force reaches its designated threshold.

Alternative embodiments may include an electronic device, such as a notebook computer, laptop, cellphone, or other mobile device that includes a circuit board coupled to a plurality of electronic components (which includes any type of components, elements, circuitry, etc.). The electronic device may also include a base portion and a top portion coupled to the base portion at a hinge configured such that the base portion and the top portion can rotate between an open configuration of the electronic device and a closed configuration of the electronic device (and hold positions with respect to one another at points in between open and closed). Certain embodiments presented herein can offer an effective hinge and docking capability that provides an orientation flexibility and connection to enable a more extensive integration between the electronic device (e.g., a tablet) and an accessory (e.g., a keyboard, audio system, a movie player system, a docking station, accessory cover, etc.).

Keyboard for Electronic Device

FIG. 1A is a simplified schematic diagram illustrating an embodiment of an electronic device 10 in an open configuration in accordance with one embodiment of the present disclosure. Electronic device 10 may include a base portion 16, comprising a keyboard 12, a touchpad 18, and a top portion 14, comprising a display 26 and one or more discs 15. Display 26 may be disposed within/on and/or supported by top portion 14. In one or more embodiments, display 26 is a screen that can be a liquid crystal display (LCD) display screen, a light-emitting diode (LED) display screen, an organic light-emitting diode (OLED) display screen, a plasma display screen, or any other suitable display screen system.

In one or more embodiments, electronic device 10 is a notebook computer or laptop computer. In still other embodiments, electronic device 10 may be any suitable electronic device having a display such as a mobile device, a tablet computer and/or a tablet device (e.g., an i-Pad™, a Microsoft Surface™, Google Nexus™, etc.), a personal digital assistant (PDA), a smartphone, an audio system, a movie player of any type, a computer docking station, etc.

In general terms, electronic device 10 can offer a suitably comfortable grip for an end user to manipulate base portion 16 (e.g., to separate it from top portion 14). Electronic device 10 may also include one or multiple discs 15 that enable an integrated detachable accessory solution from mechanical, electrical, and aesthetical standpoints. The accessory band design feature can provide mechanical and magnetic lead-in guidance and attraction force for retention during docking. Additionally, electronic device 10 may use a mechanical snap-in feature to easily attach, retain, and detach any accessory. The power of electronic device 10 can be physically isolated from its chassis and/or, further, it can be integrated within one or more of its disc assemblies. Moreover, electronic device 10 can offer docking that allows power and/or data to flow between the device and the accessory (e.g., keyboard) to which it is docked. In addition, electronic device 10 can offer a space saving integration of a clutch mechanism residing inside the volume of the disc feature. Additionally, electronic device 10 can offer an improved range of motion for the display when the device is oriented in a laptop mode, as detailed below.

Electronic device 10 may also include a middle portion that is provided between base portion 16 and top portion 14. The middle portion may aesthetically cover a portion of hinges 15 (or be proximate to multiple hinges 15) existing between base portion 16 and top portion 14. Hinges 15 can define an axis of rotation that is shared between base portion 16 and top portion 14. In at least one embodiment, base portion 16 and top portion 14 are hingedly coupled via one or more hinges 15 (as shown).

In the particular embodiment shown in FIG. 1A, electronic device 10 is a relatively thin and sleek tablet having a touch screen (e.g., 8-inch screen, 10-inch screen, 12-inch screen, etc.) and a detachable and re-attachable keyboard accessory. Electronic device 10 provides for an integrated device that can include a display section (containing a main logic board and barrel installed batteries) and a keyboard section. In addition, its hinge mechanism allows the display section to be attached to the keyboard in two different orientations: the display facing inward and the display facing outward. This mechanism can provide multiple modes (possible configurations), such as a laptop mode, tablet mode, movie mode (as well as closed mode) to a user. All of these configurations are discussed below with reference to various FIGURES that further illustrate some of the operational capabilities associated with electronic device 10.

For the particular magnetic keyboard design, the keyboard layout for electronic device 10 can provide a user experience that replicates a more traditional computer keyboard experience. Additionally, from the perspective of the user, the key travel feels like a common computer keyboard (e.g., travel could be approximately 0.5 mm vs. 2.5 mm on a traditional computer keyboard, but feels the same to the user). Moreover, there is enough separation between the keys to make it easier for touch-typers to distinguish between keys for improved touch-typing.

In a particular embodiment, the keyboard is an ultra-thin (e.g., 3.30 mm), ultra-light (e.g., 275 grams) keyboard with sufficient keyboard band stiffness and strength to serve as a tablet device cover. The keyboard can be made from a laminate construction that uses variations of key design shapes and magnets to replicate a touch-typing user experience with the feel of a typical computer keyboard. In order to account for the thinner side areas of the keyboard device, the keyboard edge keys may be pivoted on one side and, further, may have magnets only on one side in a particular embodiment of the present disclosure. The keys can be of any suitable type such as toggle operation keys, for example, with an arrow key operation that merges four keys that cannot move diagonally. A plurality of magnets can be provisioned at various locations of the keyboard (e.g., away from the center of the keys).

In operation, the spacing between the keys of the keyboard can enable a touch-typer to easily distinguish between keys using their fingers. Edge keys can be specially designed for thinner sides and, further, utilize varying magnet configurations. An edge key configuration allows keys to hang over the edge of the support base to accommodate the thinner sides of the keyboard device. Magnets can be suitably positioned to minimize the toggle affect. A toggle key configuration can be used with the arrow keys in certain keyboard layouts.

For the magnetic keys, the use of magnets embedded within the keys and attracted to a ferrous top plate above the sides of the keys can provide the user with the sense of a traditional computer keyboard key travel and customary rigidity. The keyboard can also provide a keypress confirming the depression of the key. In certain implementations, the keyboard keys are biased upward with electrically conductive pads beneath the keys, which trigger a keypress. For the actual keyboard construction, a laminate construction may be employed in conjunction with an injection mold, where the metal is integrated into the plastic. A flexible printed circuit board (FPC) can also be used in certain embodiments of the present disclosure. Connections can be formed to the bands and a small battery may be optionally inserted into the keyboard to provide a limited backup power supply. In one non-limiting example, the tablet keyboard dimensions are approximately: 261.40 mm(X)×170.16 mm(Y)×3.30 mm (Z, key top-to-bottom surface). Other embodiments of the keyboard can include any suitable dimensions, sizes, and shapes: all of which are encompassed by the present disclosure.

Note that any number of connectors (e.g., Universal Serial Bus (USB) connectors (e.g., in compliance with the USB 3.0 Specification), Thunderbolt™ connectors, WiFi connectors, a non-standard connection point such as a docking connector, etc.) and a plurality of antennas can be provisioned in conjunction with electronic device 10. [Thunderbolt™ and the Thunderbolt logo are trademarks of Intel Corporation in the U.S. and/or other countries.] The antennas are reflective of electrical components that can convert electric currents into radio waves. In particular examples, the antennas can be associated with WiFi activities, wireless connections more generally, small cell deployments, Bluetooth, 802.11, etc.

In at least one example embodiment, the motherboard of electronic device 10 is a general circuit board that can hold various components of the internal electronic system of electronic device 10. The components may include a central processing unit (CPU), a memory, etc. The motherboard can also couple to one or more connectors in order to accommodate other peripherals sought to be used by a user of electronic device 10. More specifically, the motherboard can provide the electrical connections by which the other components of the system can communicate.

Any processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

In a particular embodiment, touchpad 18 is a pointing device that features a tactile sensor, a specialized surface that can translate the motion and position of a user's fingers to a relative position on screen. Touchpad 18 can be used in place of a mouse (e.g., where desk space is scarce or based on user preference). Touchpad 18 can operate using capacitive sensing, conductance sensing, or any other appropriate sensing technology. In a particular embodiment, a suitable battery can be provisioned proximate to touchpad 18 in order to power its operations. In addition, either surface (or both surfaces) of display 26 can be a touch display that uses any of the technologies discussed herein.

Figure 1B:
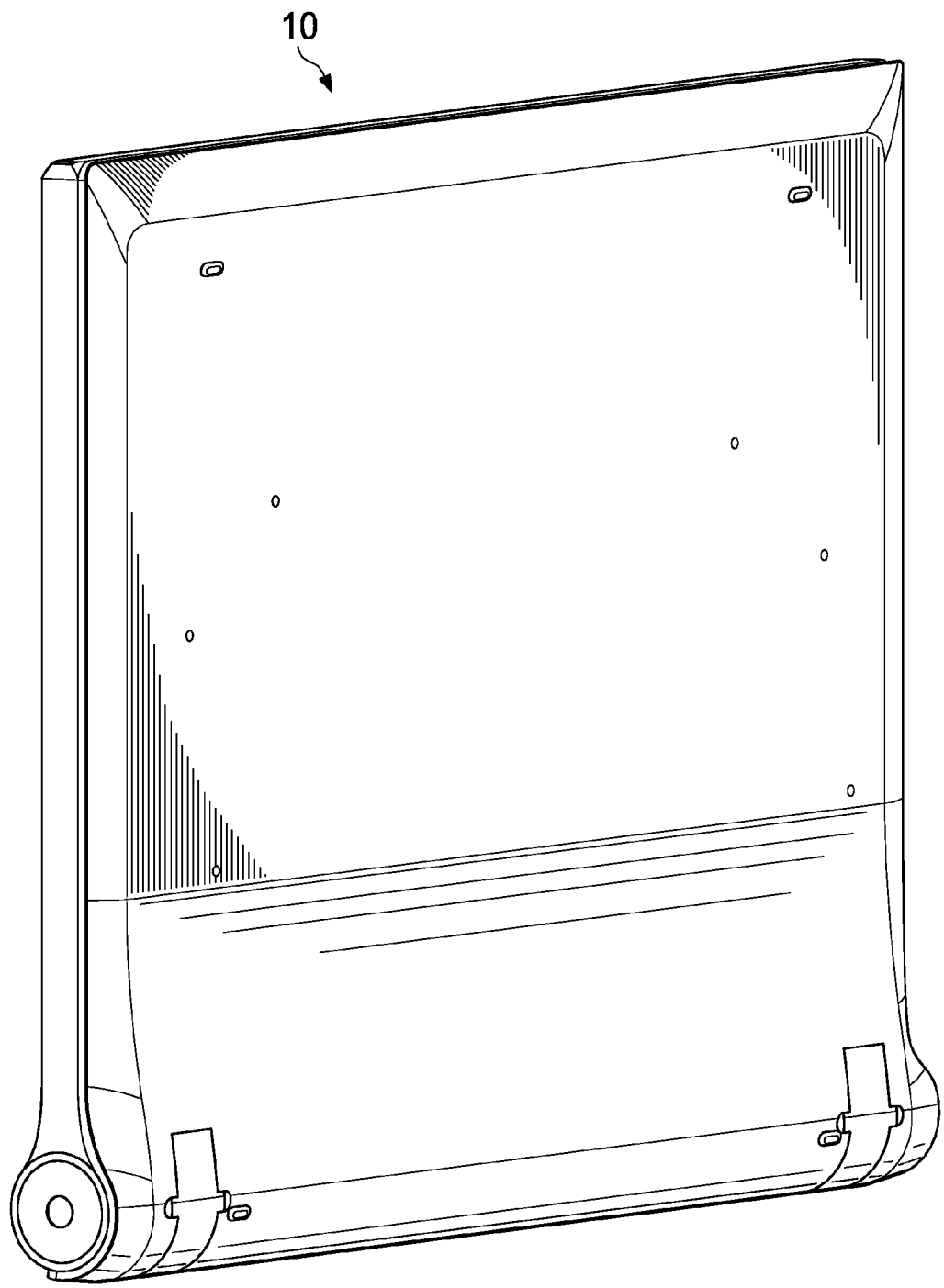
FIG. 1B is a simplified schematic diagram illustrating an embodiment of an electronic device with an attached keyboard, in a closed configuration in accordance with one embodiment of the present disclosure.

Turning briefly to FIG. 1B, FIG. 1B is a simplified schematic diagram illustrating a side view of electronic device 10 in a closed configuration. In operation, when electronic device 10 is in a closed position, the thin plastic keyboard can protect the display. When the display section is flipped up to an open position, it operates in a traditional laptop orientation (i.e., a keyboard resting on a surface with a display held in an upright position). In a particular embodiment, electronic device 10 includes an 18.5 mm pitch full-size keyboard that provides for an optimal touch-typing experience. When the display section is flipped upside-down to face outwardly away from the key elements of the keyboard, electronic device 10 can operate in a tablet configuration with the keyboard nested behind the screen and out of the way of user interaction. Its barrel-shaped hinge mechanism feature can serve as an ideal grip for the end user. In this mode, the keyboard can be stowed behind the display. In the tablet mode, the display can still be flipped up. In this mode, the keyboard can operate as a stand (behind the display), and the device can become a stationary display (e.g., movie mode). When the display section is detached from the keyboard, it can function as a simple lightweight tablet by itself.

In the case where the accessory of electronic device 10 is a keyboard, then the keyboard main components can include various elements. For example, the keyboard can include a keyboard body reflective of a unibody-molded part that may use insert and/or comolding methods to eliminate visible fasteners. In addition, the keyboard body may further include insert-molded band features to provide stiffness to the outer portion of the scoop geometry as well as transmit rotational loads, which inhibit top portion 14 from rotating with respect to bottom portion 16. Also provided are one or more band features that can provide for a magnetic attraction of the ferrous disc shaped features of the tablet.

Electrical current can be passed from the tablet to the keyboard to recharge an on-board battery or capacitor, or power any number of items (e.g., a Bluetooth radio). Additionally, the tablet can be suitably anchored to the keyboard to prohibit a toothed disc feature from rotating with respect to the keyboard, while allowing the tablet to concentrically rotate in the "scoop" part of the keyboard through one or more clutch elements in the tablet. In terms of Bluetooth capability, the power can reach the radio by passing current through the bands/socket. The tablet can include electrically protected (but "hot") toothed discs. The Bluetooth radio circuit board can have a direct current (DC) rectifier to power the electronics independent of the orientation of the tablet (i.e., laptop mode vs. tablet mode, etc.).

For the actual keys, in a particular non-limiting embodiment, the keys are configured with a 0.5 mm travel distance (for the individual keys). In addition, tactile feedback can be provided (e.g., 70 gram with "cliff drop" force deflection feel) to mimic the typing experience of traditional keyboards. In certain implementations, there is little (or no) dead space on the keyboard surface. There can be various types of keys on the keyboard. For example, the keyboard can include pivoting keys (e.g., left edge: tilde, tab, caps lock, shift, left ctrl; right edge: backspace, backslash, enter, shift), rocking keys such as the arrow keys, and substantially vertical travel keys such as function keys and other keys that are not along the right or left edge, etc. Additional details associated with this potential keyboard layout are discussed below with reference to additional FIGURES.

Electronic device 10 can also include a nonferrous web that provides sufficient stiffness to the keyboard body. The web can provide a guide for keys to move vertically, but appropriately restrain x-y motion. In addition, a ferrous top plate can increase the stiffness of keyboard, retain keys from falling out, and attract magnetic keys to bias them upwards.

In certain example embodiments, the design of electronic device 10 can allow a tablet to connect to the keyboard in both a laptop type mode and a tablet type mode, in addition to a movie stand type mode. The range of viewing angle adjustment is continuous (e.g., extending between 0 and 125°, or 159, or more, or different ranges may be provided). 0° can correspond to the fully closed position, whereas 125° (or a similar angle) can be designated as reflective of electronic device 10 being fully opened. There can be two socket modules built into the tablet side of the device, which are magnetically attracted to the nesting features built into the keyboard.

Figure 2:
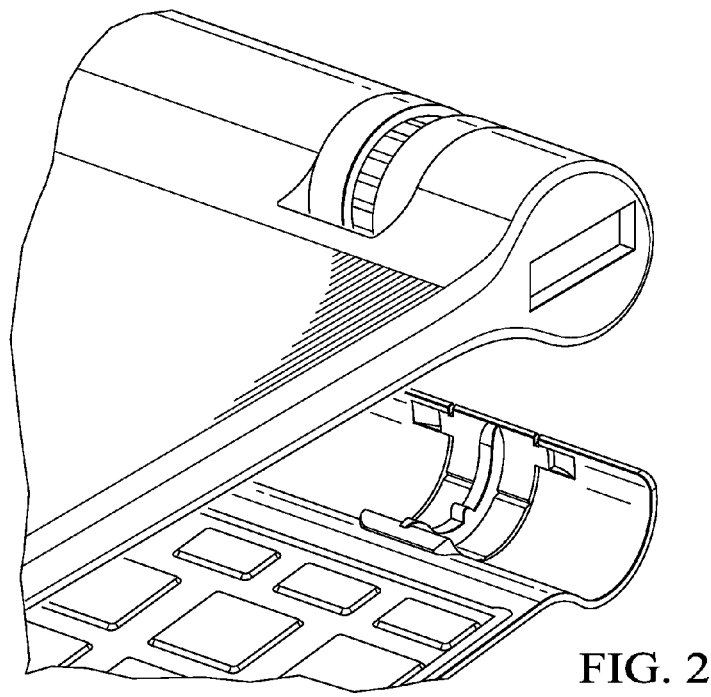
FIG. 2 is a simplified schematic diagram illustrating an orthographic view of the electronic device shown separated into two segments.
Figure 3:
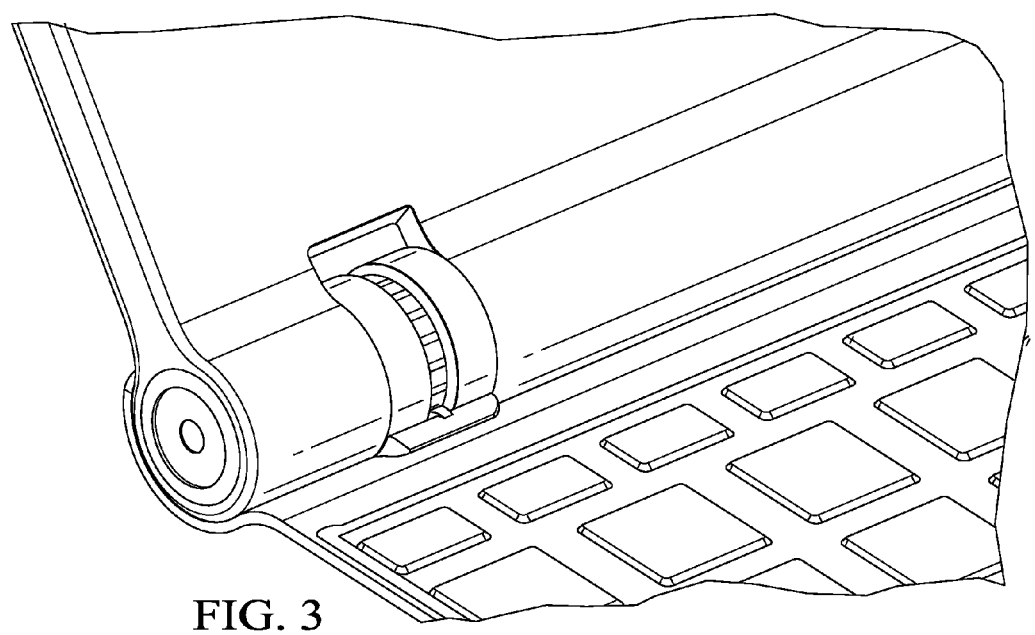
FIG. 3 is a simplified schematic diagram illustrating an orthographic view of the electronic device when the two segments are connected together.

FIG. 2 is a simplified schematic diagram illustrating an orthographic view of electronic device 10 being separated into two segments. FIG. 3 is a simplified schematic diagram illustrating an orthographic view of the electronic device when the two segments are connected together. Focusing for a moment on the disc clutch, the specific design of electronic device 10 integrates the clutch element the resides inside the volume of the disc features of the electronic device and, further, saves space by incorporating elements of the disc into the clutch (i.e., a toothed wheel). In general, the design and assembly mechanism allows the tablet disc sub-assembly to be installed into a slot in the tablet enclosure that is smaller in width than the disc sub-assembly in its installed configuration. The actual disc can be designed with an electrical power connection that is physically isolated from the chassis. Additionally, electronic device 10 offers a friction clutch integration with a disc-toothed wheel feature in the center (or other location) of the disc features in the electronic device (e.g., for improved range of motion, more compact size, position hold capabilities, and better torque transition characteristics).

The magnetic band segments in the accessory (e.g., the keyboard) can attract the ferrous rings of the tablet discs. The center rib (discussed in detail below) provides an amplified magnetic strength focused into the band. During insertion of top portion 14 into bottom portion 16, the center toothed wheel features of the tablet disc, which are connected to the clutch, engage the tooth at the center of the accessory scope. The center rib of the accessory scoop can serve to provide a suitable alignment lead-in function. The encasing can provide a directional focus for the magnetic field. In a particular embodiment, a clutch with bidirectional uniform torque properties is provisioned in the disc. This can allow top portion 14 to be inserted into bottom portion 16 in either orientation and, further, provide the uniform resistance to motion. This is in contrast to a typical standard laptop clutch, which may provide less resistance in one direction or variable resistance based on the angle between the screen and the keyboard.

Figure 4:
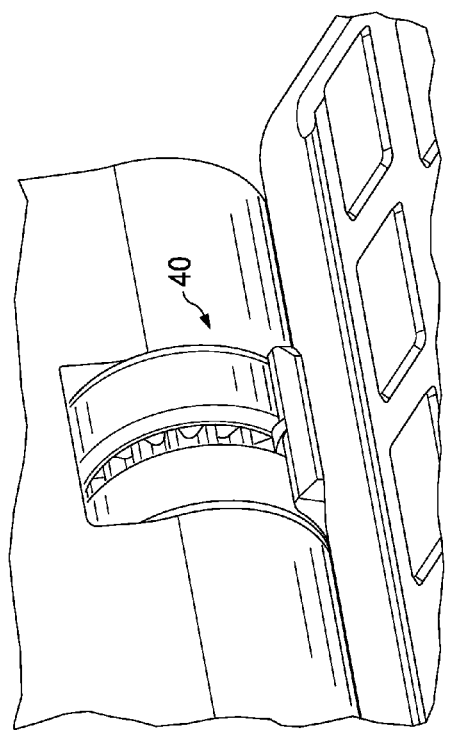
FIG. 4 is a simplified orthographic view of a disc feature of the electronic device.
Figure 5:
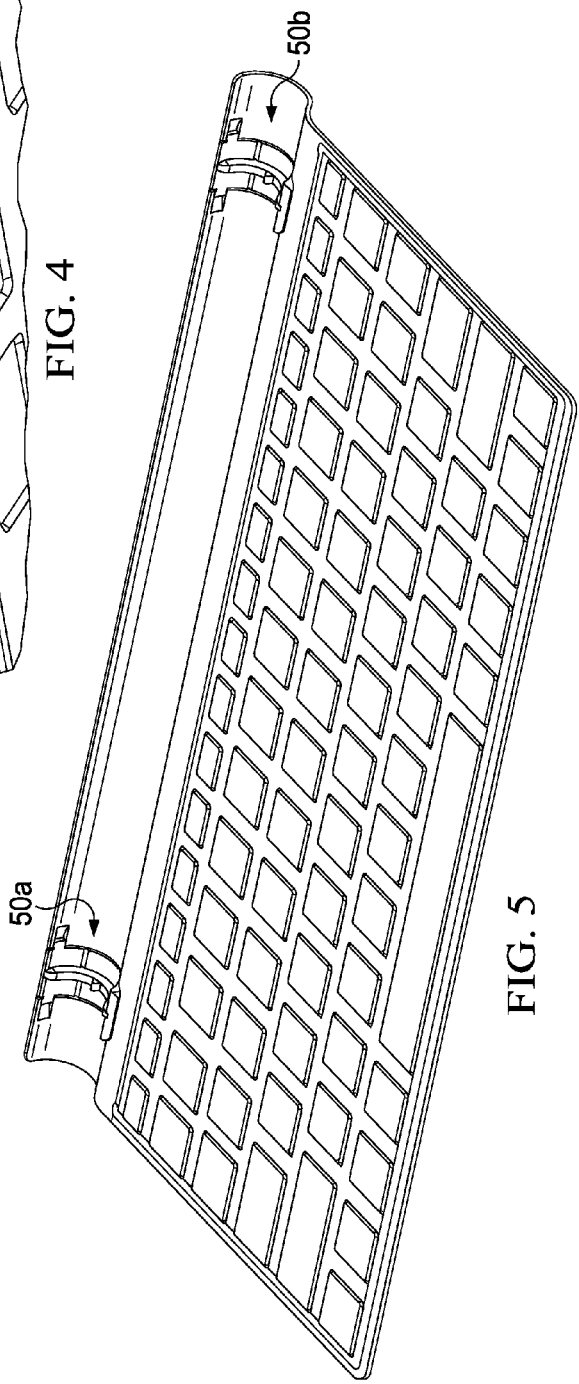
FIG. 5 is a simplified schematic diagram illustrating an orthographic view of the keyboard of the electronic device in accordance with one example implementation.

FIG. 4 is a simplified orthographic view of a disc groove 40 of electronic device 10. In this particular embodiment, disc groove 40 can be in the range of 1.0-3.5 millimeters, although alternative embodiments could have any other suitable dimension. FIG. 5 is a simplified schematic diagram illustrating an orthographic view of a potential accessory of electronic device 10 in accordance with one example implementation. This particular embodiment includes symmetrical segments 50a-50b that can engender a suitable coupling for a given accessory. For example, an accessory such as a keyboard, when attached, becomes integrated to allow power to flow between the tablet's disc mechanism and the keyboard and, thus, power the Bluetooth radio embedded in the keyboard.

Figure 6:
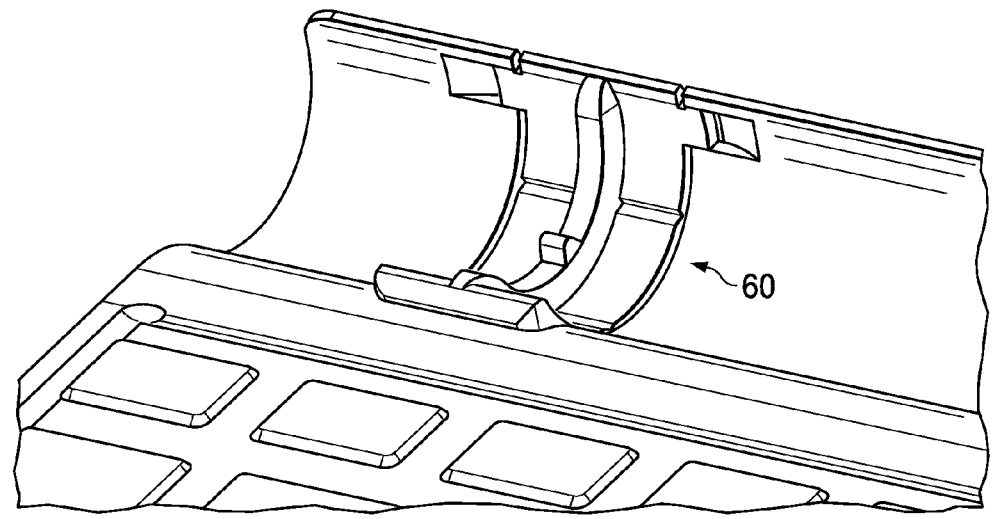
FIG. 6 is a simplified schematic diagram illustrating an orthographic view of the front of an accessory dock connection feature of the keyboard in accordance with one embodiment of the present disclosure.
Figure 7:
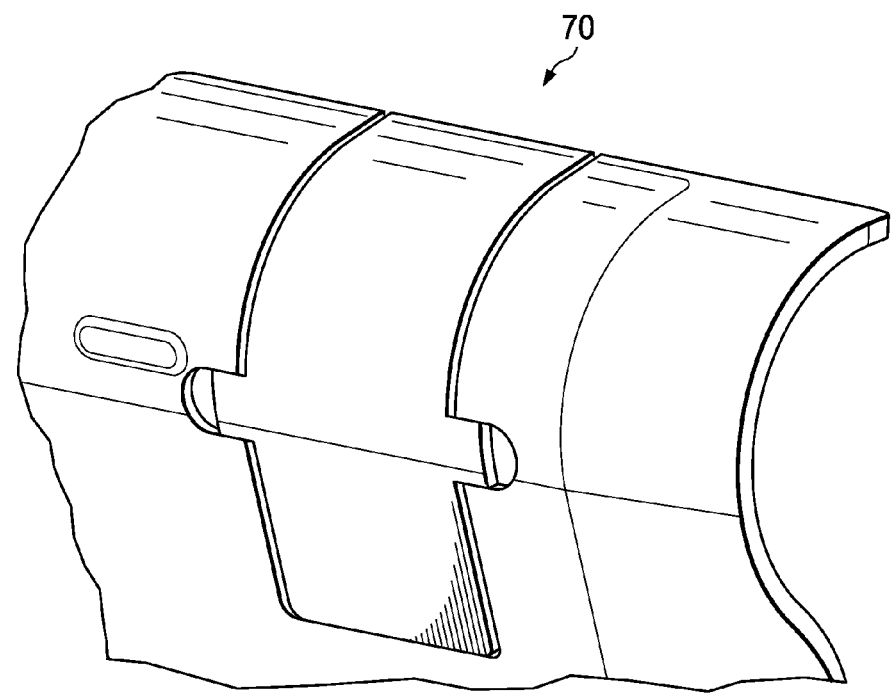
FIG. 7 is a simplified schematic diagram illustrating a view of the rear of an accessory dock connection feature of the keyboard in accordance with one embodiment of the present disclosure.

FIG. 6 is a simplified schematic diagram illustrating an orthographic view of an accessory dock 60 of electronic device 10 in accordance with one embodiment of the present disclosure. Accessory dock 60 can provide a suitable lead-in/guidance feature during connection activities. FIG. 7 is a simplified schematic diagram illustrating the underside of the accessory band components associated with electronic device 10. Magnet components 70 on the opposite side (and installed in the band) may be accompanied by a suitable backing (e.g., a steel backing) to reduce unwanted stray magnetic fields. Without such a backing, magnetic forces would have an increased likelihood of interaction with other components, alter credit card information, corrupt certain storage elements, etc. The shape of the band/keyboard and the tablet transition can allow for a cam-out release of the tablet from the keyboard by using the tablet as a lever to overcome the strong magnetic pull force of the connection. The magnetic pull from the keyboard to the tablet can ensure an electric contact and mechanical connection between the keyboard bands and the tablet. The clutch assembly can be electrically isolated from the tablet and keyboard enclosures to allow positive and negative connections between the tablet and the keyboard made through the two clutches. The physical contact of the toothed wheel features of the tablet disc elements to the torque transmission tooth of the keyboard bands allows for electrical power and/or signals to pass from the tablet to the keyboard. The toothed disc can suitably transmit torque from the keyboard to the tablet. Additionally, certain embodiments may use a plastic-housed clutch element to electrically isolate the toothed disc from the chassis.

Figure 8:
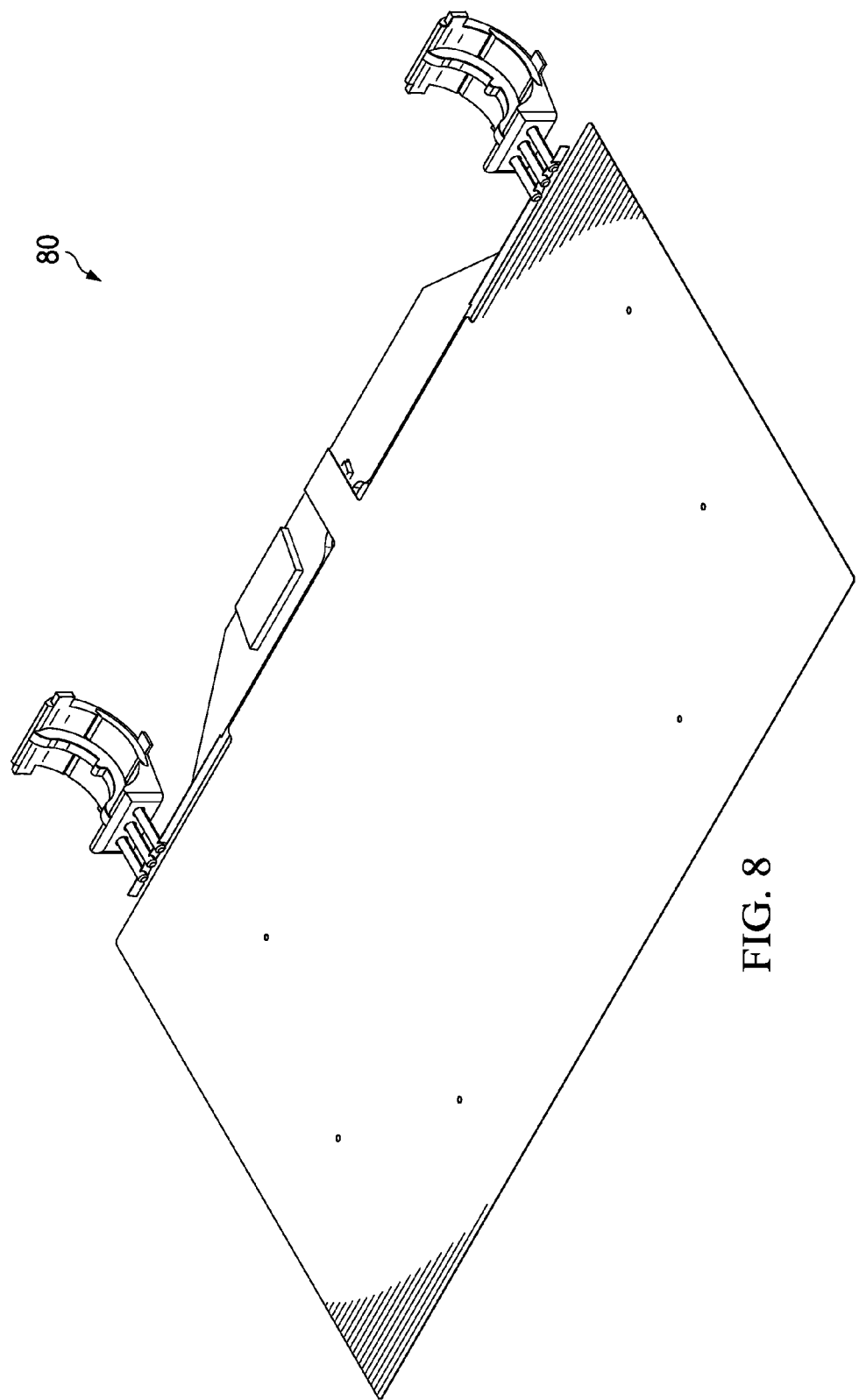
FIG. 8 is a simplified schematic diagram illustrating an orthographic view of an embodiment that includes an integration of an accessory dock connection feature with its magnetic band segments that attract disc elements of the electronic device.
Figure 9:
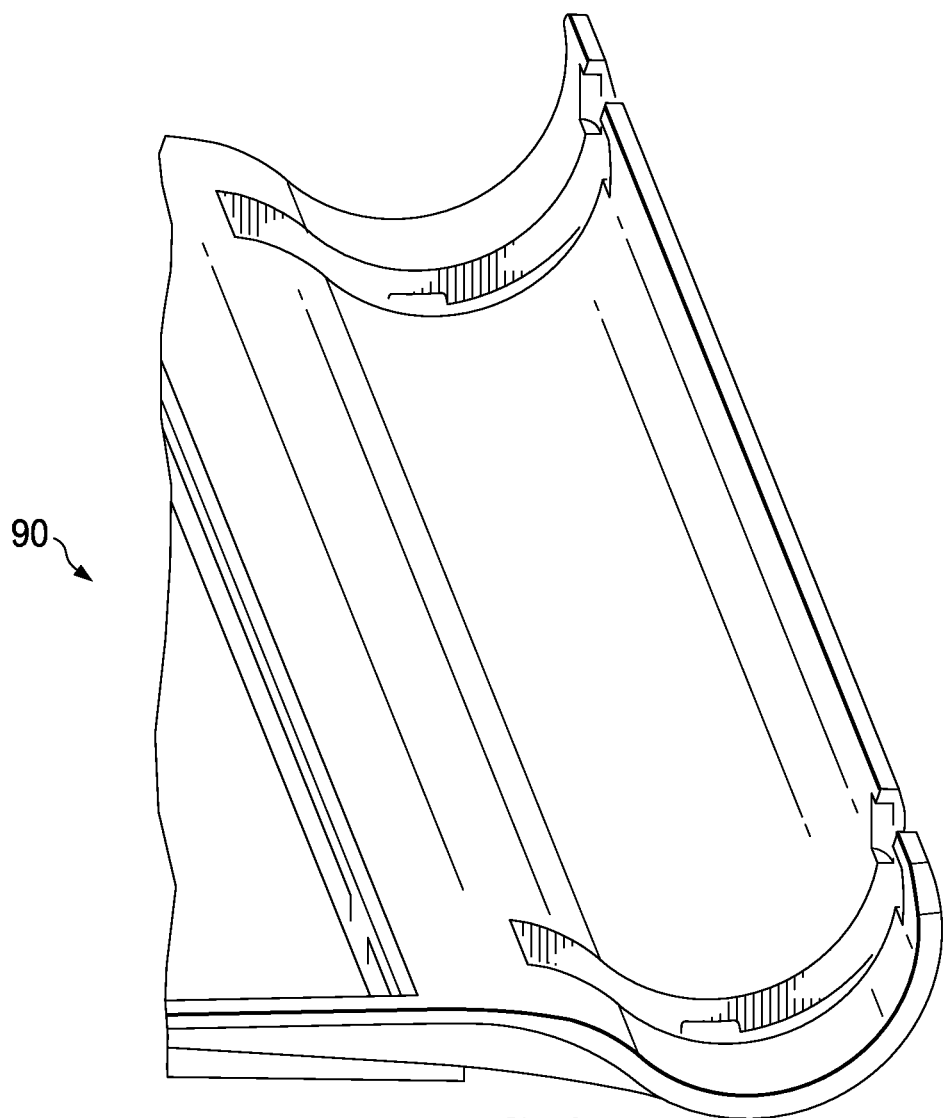
FIG. 9 is a simplified schematic diagram illustrating an orthographic view showing an embodiment of the keyboard without the accessory dock connection features.

FIG. 8 is a simplified schematic diagram illustrating an orthographic view of the keyboard electronics and magnetic bands 80 with the surrounding keyboard housing removed. FIG. 9 illustrates a keyboard housing 90 with the associated keyboard electronics and magnetic bands removed.

Figure 10:
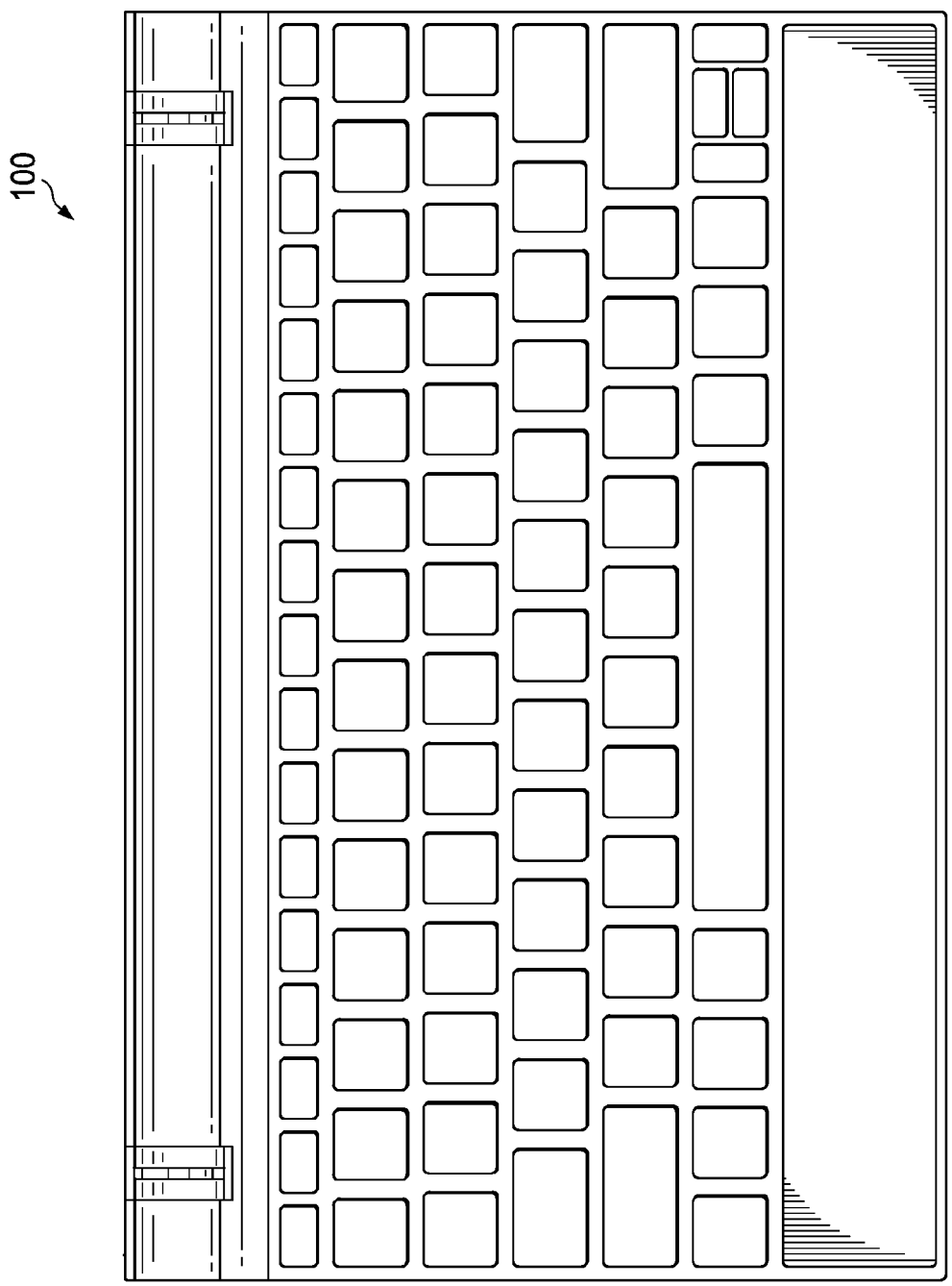
FIG. 10 is a simplified schematic diagram illustrating an example keyboard layout associated with the electronic device.
Figure 11:
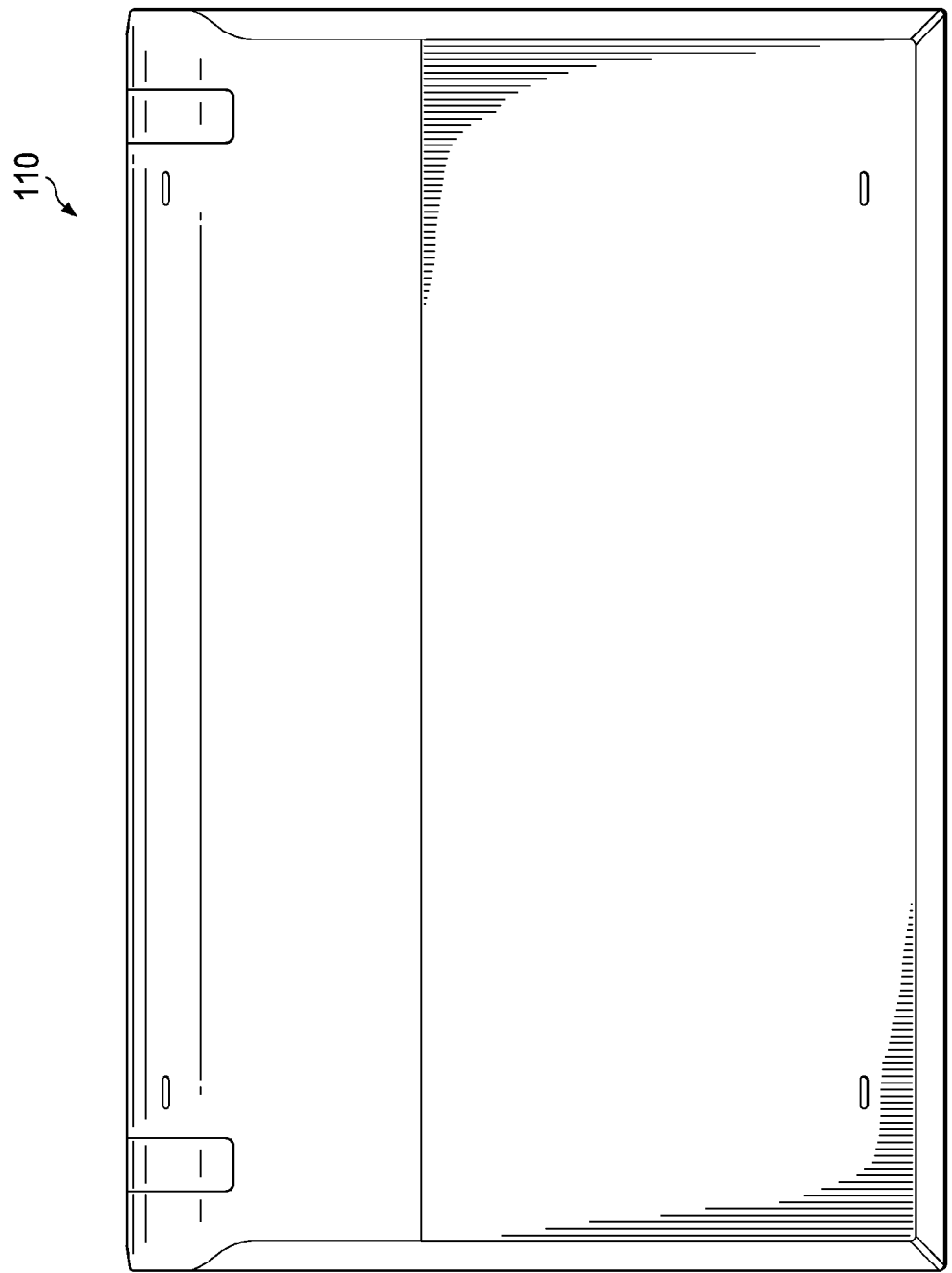
FIG. 11 is a simplified schematic diagram illustrating an underside view of the keyboard associated with the electronic device.

FIG. 10 is a simplified schematic diagram illustrating an example keyboard 100 associated with electronic device 10. FIG. 11 is a simplified schematic diagram illustrating a closed position 110 associated with electronic device 10 as viewed from the underside of keyboard 100. This particular arrangement of keyboard 100 may offer key travel characteristics to be approximately 0.5 mm (in certain non-limiting embodiments) versus a key travel provided by a traditional computer keyboard (e.g., in the order of 2.5 mm), yet the keyboard feel (from the perspective of the user) is the same. Additionally, there can be enough separation between keys to make it easier for touch-typers to distinguish between keys for improving touch-typing activities. Separately, in a particular embodiment, keyboard 100 is ultra-thin (approximately 3.30 mm) and ultra-light (approximately 275 grams) and possesses sufficient keyboard band stiffness and strength to serve as a tablet device cover.

In terms of its construction, in at least one example implementation, keyboard 100 is formed as part of a laminate construction that uses variations of key design shapes and magnets to replicate the touch-typing user experience with the feel of a standard computer keyboard. Additionally, specific design shapes for each version of the keyboard keys are envisioned. In order to account for the thinner side areas of the keyboard device, keyboard edge keys may be pivoted on one side and may have magnets only on one side. Also, keys may be toggle operation keys, for example, an arrow key operation that merges four keys (e.g., prohibited from moving diagonally), where magnets are positioned far from the intended touch area and provide an axis about which the multi-key pivots.

In regards to the magnetic keys, the use of magnets under the keys is used to provide the feel of a traditional computer keyboard key travel, along with an expected rigidity profile for the keys. Further, certain embodiments of keyboard 100 may provide a physical keypress confirming the depression of the key. Yet another particular implementation may involve a magnetic repulsive keyboard with conductive pads, as discussed in more detail below.

For the actual keyboard construction, any type of laminate, composite, plastic, etc. may be used as part of the construction. In one particular example, keyboard 100 is built in a laminate format in which injection molding is performed, where the metal is integrated into the plastic. The keyboard construction includes a flexible printed circuit board. Connections can be formed to the bands, where a small battery is inserted for limited backup power, and where a high bond acrylic is used has an adhesive to bond components together.

Figure 12:
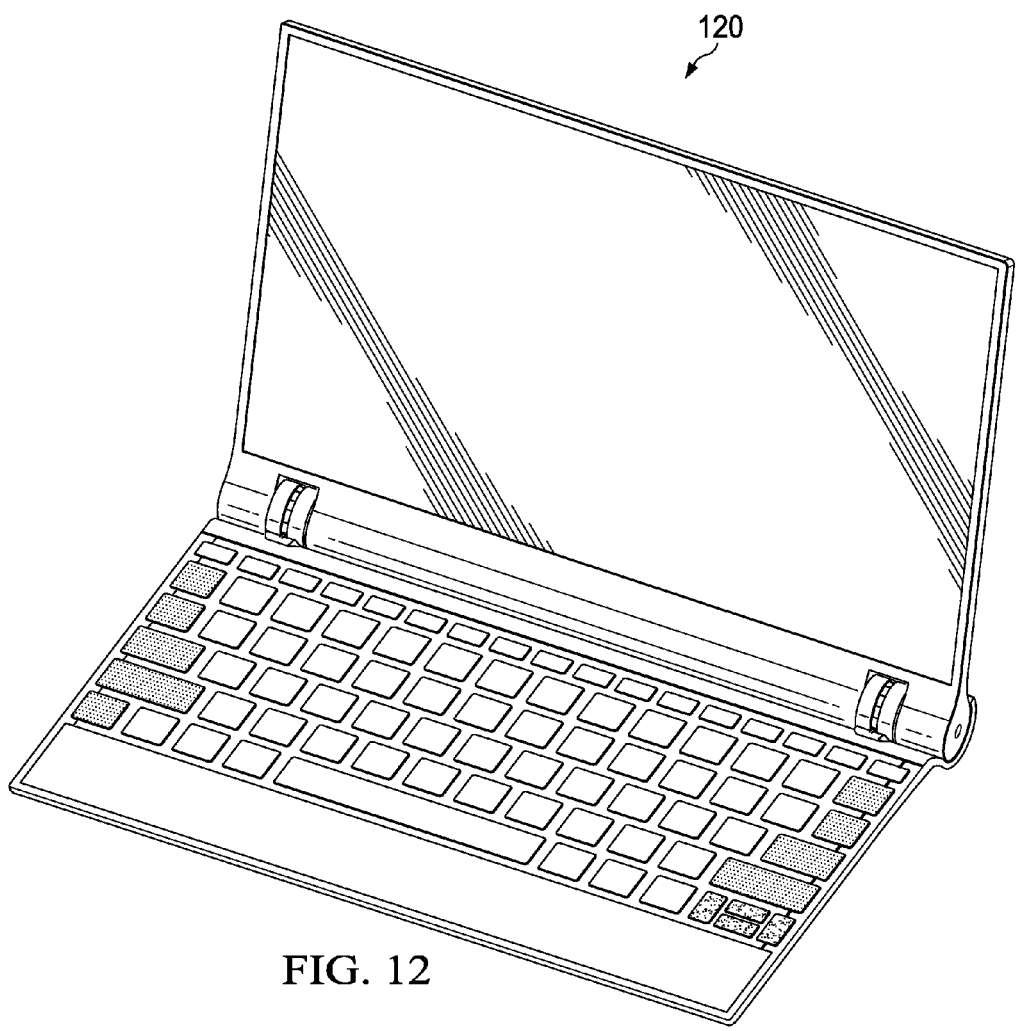
FIG. 12 is a simplified schematic diagram illustrating another view in an open position of the electronic device.

FIG. 12 is a simplified schematic diagram illustrating an open position 120 associated with electronic device 10. In terms of the main components of keyboard 100, in particular embodiments, the keyboard body is a unibody molded part (e.g., to eliminate visible fasteners). Insert-molded bands can be included in the design to provide stiffness to the outer portion of the scoop geometry. Additionally, bands can be used to provide a magnetic attraction of the socket, to pass electric current from the tablet to keyboard 100 (e.g., to power Bluetooth radio), and to anchor the socket to prohibit toothed disc rotation, while allowing the tablet to concentrically rotate in the scoop part of the keyboard.

Any number of key designs can be implemented in conjunction with keyboard 100. For example, tactile feedback (e.g., 70 gram with "cliff drop" force deflection feel) can be provided to the design. Additionally, there can be several types of keys: pivoting keys (e.g., left edge: tilde, tab, caps lock, shift, left ctrl; right edge: backspace, backslash, enter, shift, arrows). Substantially vertical travel keys can be provided for the function keys and for the other keys that are not along the right or left edge. In certain implementations, the web/top plate structure can provide stiffness for the keyboard body. Additionally, the web structure can provide a guide for keys to move vertically, but restrain x-y motion. The top plate can increase stiffness of keyboard 100 and retain keys from falling out, where the steel plate attracts magnetic keys to bias them upwards.

In terms of Bluetooth capabilities, power can reach the radio by passing current through the bands/socket. The tablet can include electrically protected but "hot" toothed discs. The Bluetooth radio circuit board can include a DC rectifier to power the electronics independent of orientation of the tablet (i.e., laptop mode vs. tablet mode). The particular design of electronic device can also include a magnetic latch. The magnetic latch can include rare earth magnets with alternating polarity, along with a steel backplate to reduce stray magnetic fields through the underside of the keyboard and to concentrate magnetic fields in the direction of the tablet.

Focusing on the key design, one example configuration of the present disclosure involves providing for a maximum travel key distance with tactile feedback. One objective of the key design is to offer the ability to rest one's fingers on the keyboard without actuating keys (touch-typing), while minimizing the z-height, as previously defined. Spacing between keys enables a touch-typer to easily distinguish between the keys with fingers. Edge keys can be specially designed for thinner sides and, further, utilize various magnet configurations.

Figure 13:
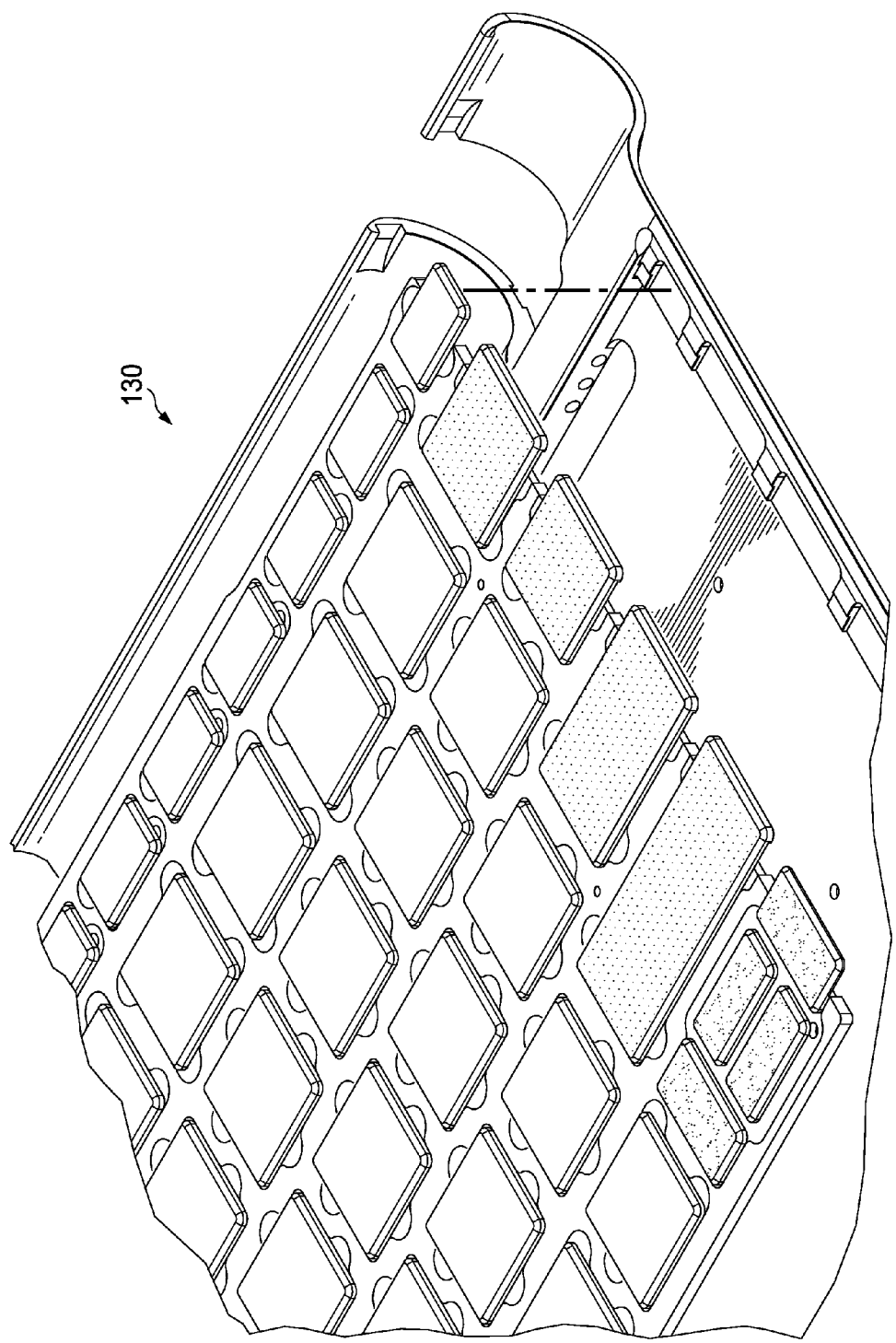

FIG. 13 is a simplified schematic diagram illustrating an edge key configuration 130. The edge key configuration allows keys to hang over the edge of the support base to accommodate the thinner sides of the keyboard structure. Magnets can be suitably placed to minimize toggle affect. The toggle key configuration can be used with the arrow keys.

Figure 14:
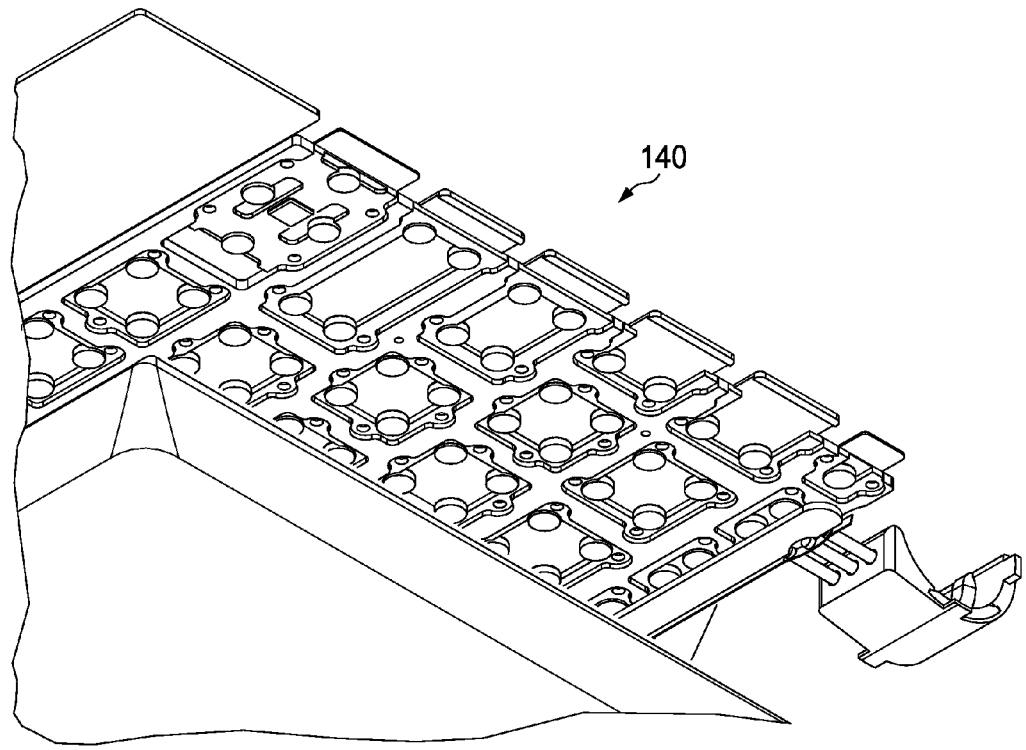

FIG. 14 is a simplified schematic diagram illustrating an example key configuration 140 associated with the present disclosure. In this example, the arrow key operation merges four keys, where diagonal movement is.

Figure 15:
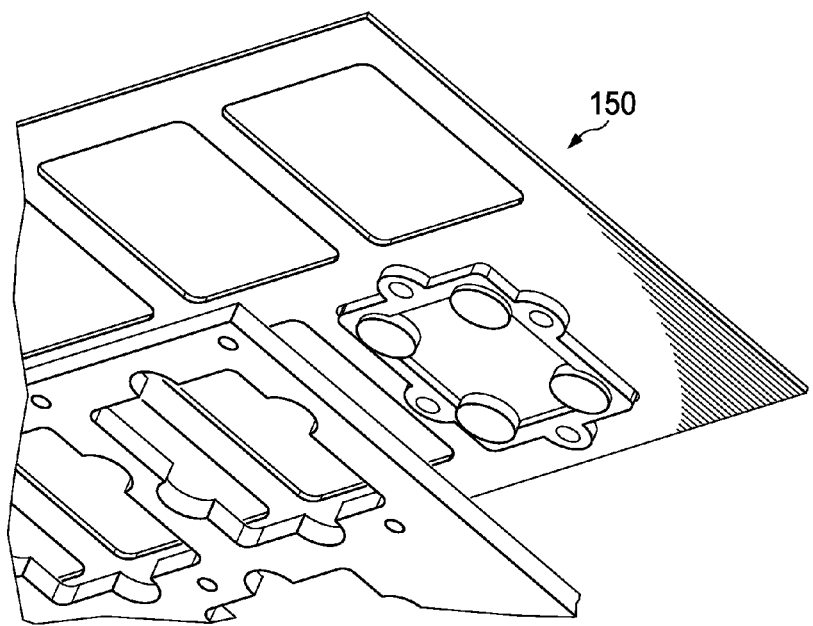
Figure 16A:
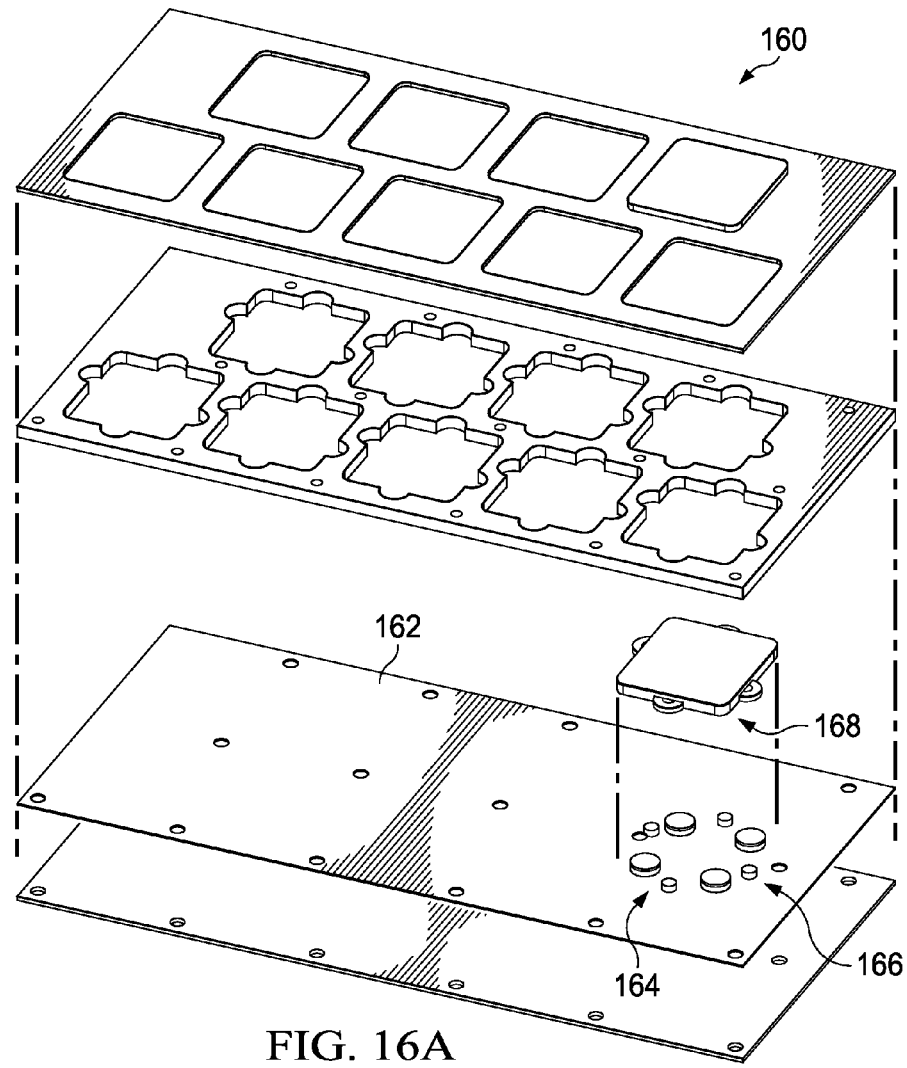
Figure 16B:
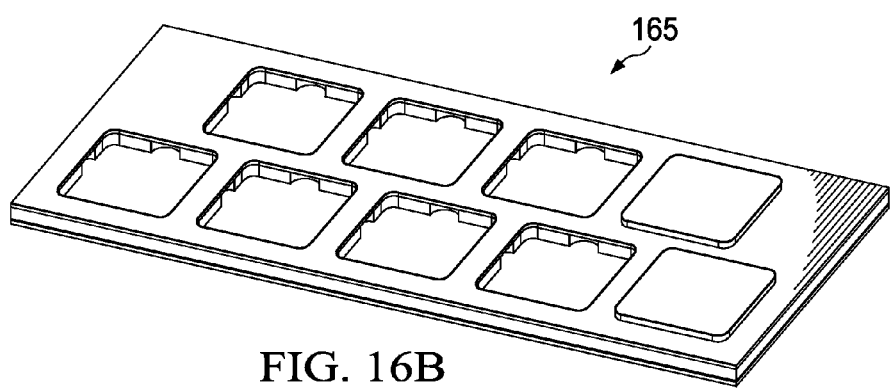

FIG. 15 is a simplified schematic diagram illustrating an example magnet configuration 150. Magnets are used in conjunction with the keys to provide the rigidity and fall customary to standard computer keyboard keys. FIGS. 16A-16B are simplified schematic diagrams illustrating one potential arrangement associated with a keyboard configuration 160. More specifically, FIG. 16A illustrates multiple layers of an example keyboard construction in which a layer 162 includes conductive traces that are connected during a keypress by a number of conductive pads (larger circles 164) that align with outboard tab portions of a respective key, as is shown. Additionally, a number of magnets, 166 (the smaller circles) are provided that are embedded into a key 168. In addition, FIG. 16B illustrates the merging of certain components and layers of FIG. 16A to form a portion of an example keyboard configuration 165.

Figure 17A:
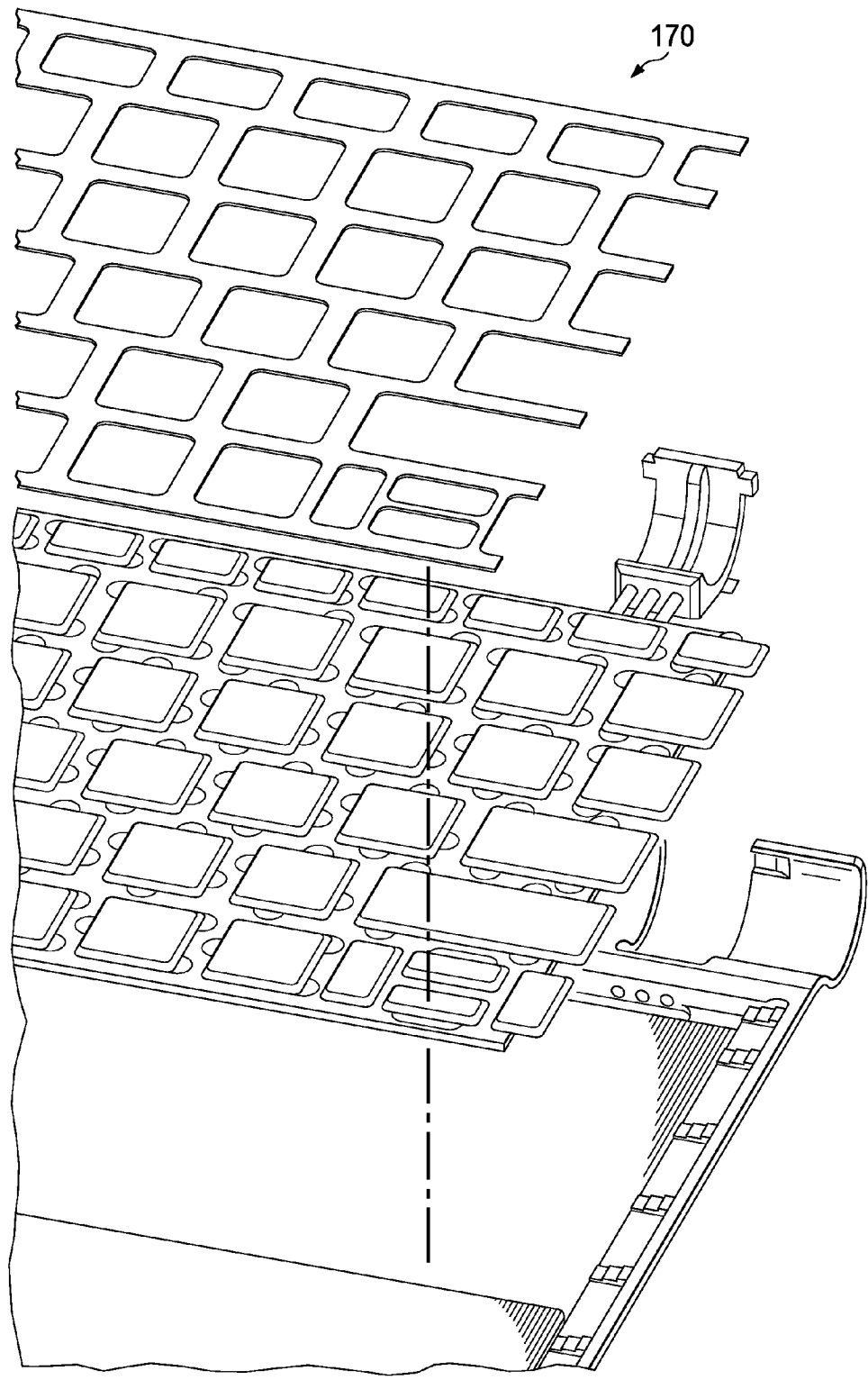
Figure 17B:
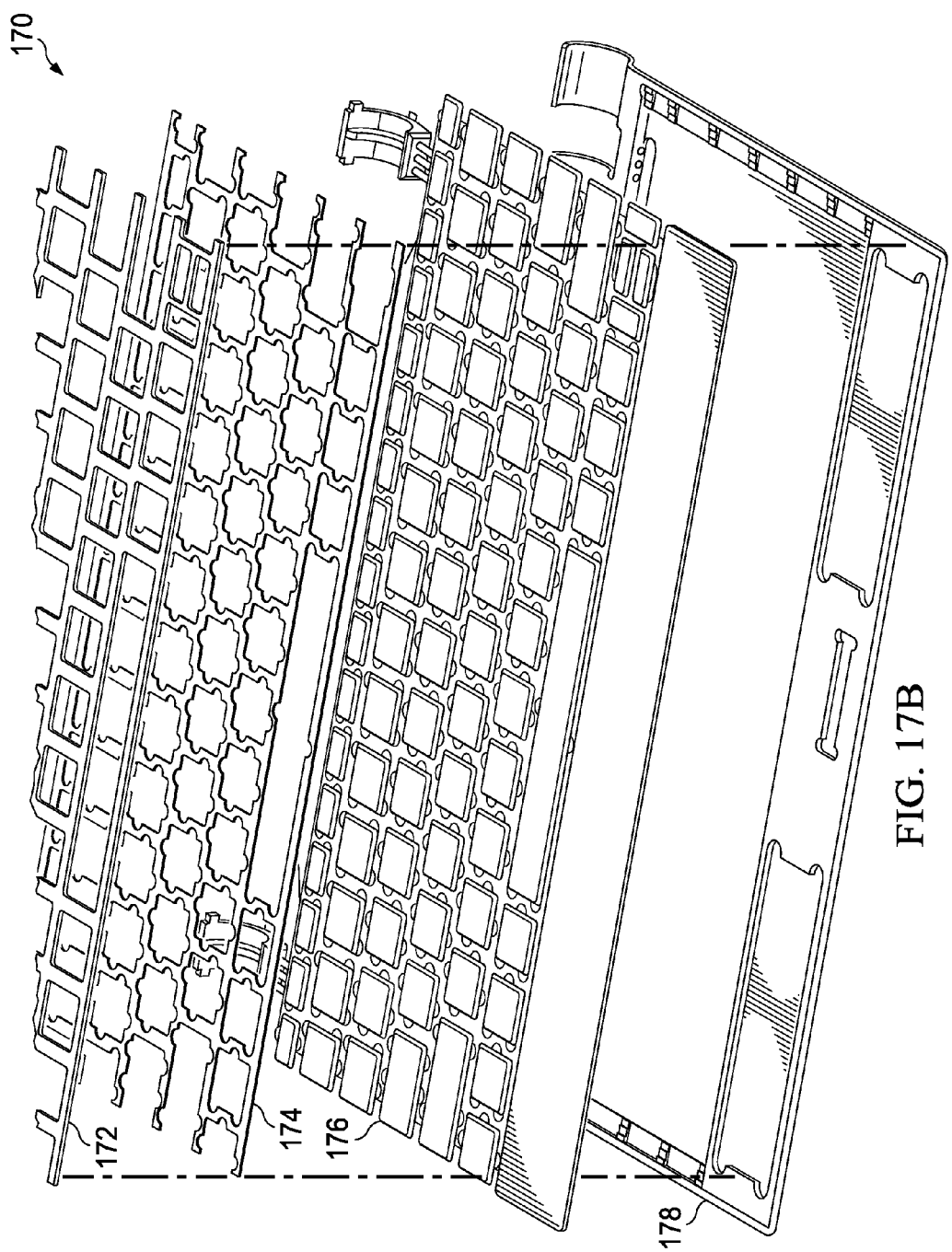
Figure 18A:
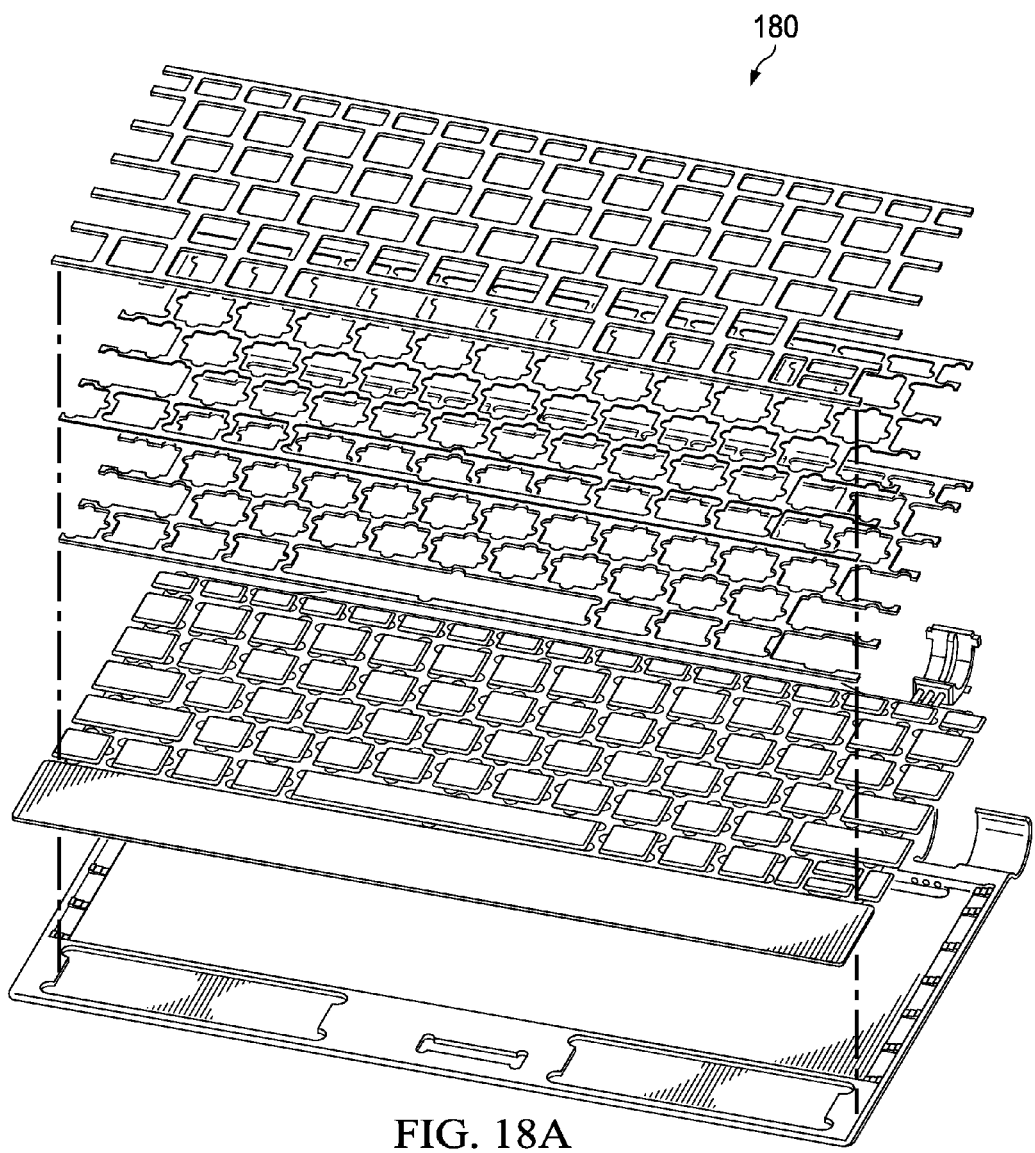
Figure 18B:
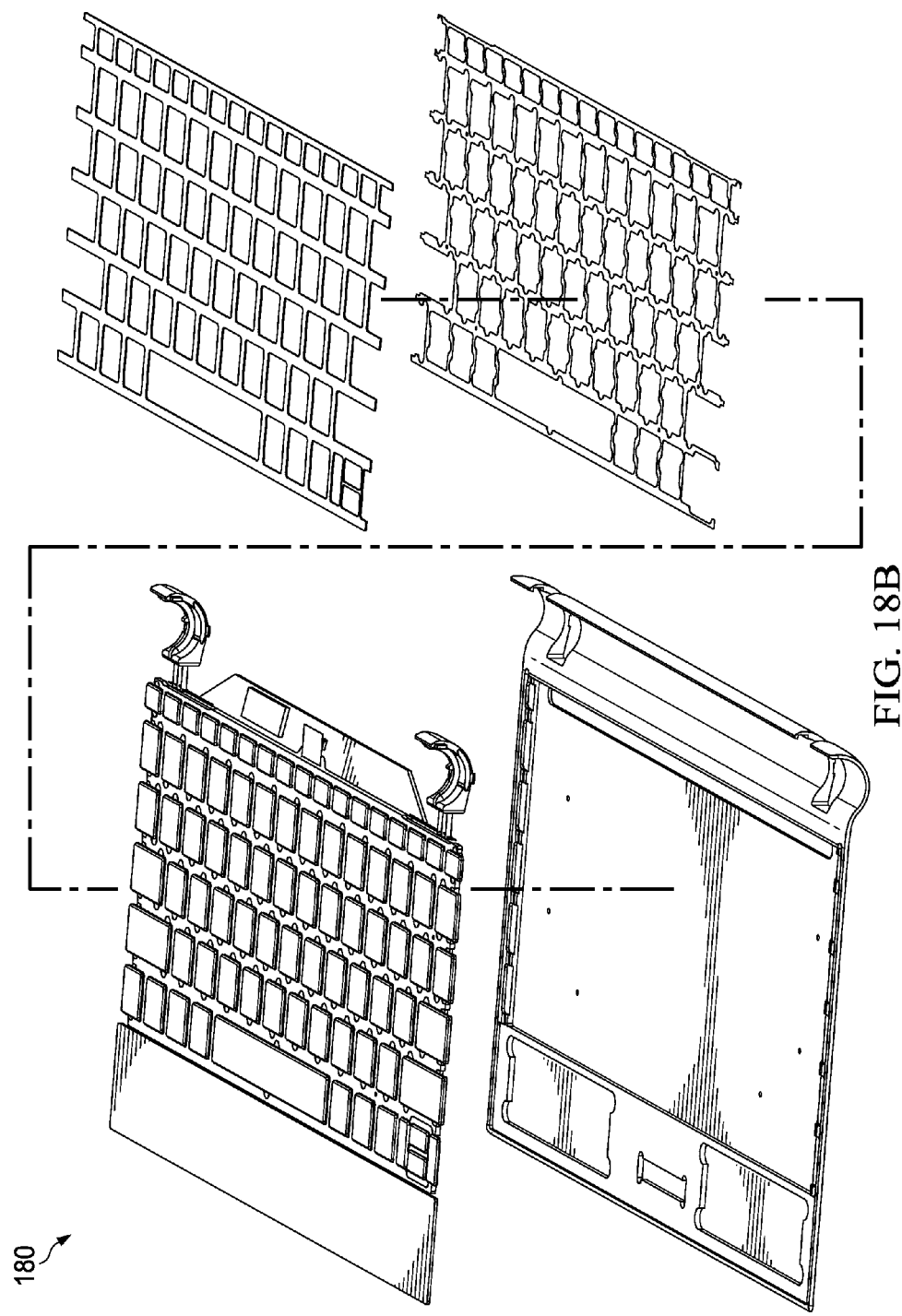

FIGS. 17A-17B are simplified schematic diagrams illustrating one potential arrangement associated with a laminate keyboard configuration 170. FIGS. 18A-18B are simplified schematic diagrams illustrating another potential arrangement associated with a laminate keyboard configuration 180. Additional details associated with various possible keyboard constructions are further discussed below with reference to additional FIGURES.

Figure 19A:
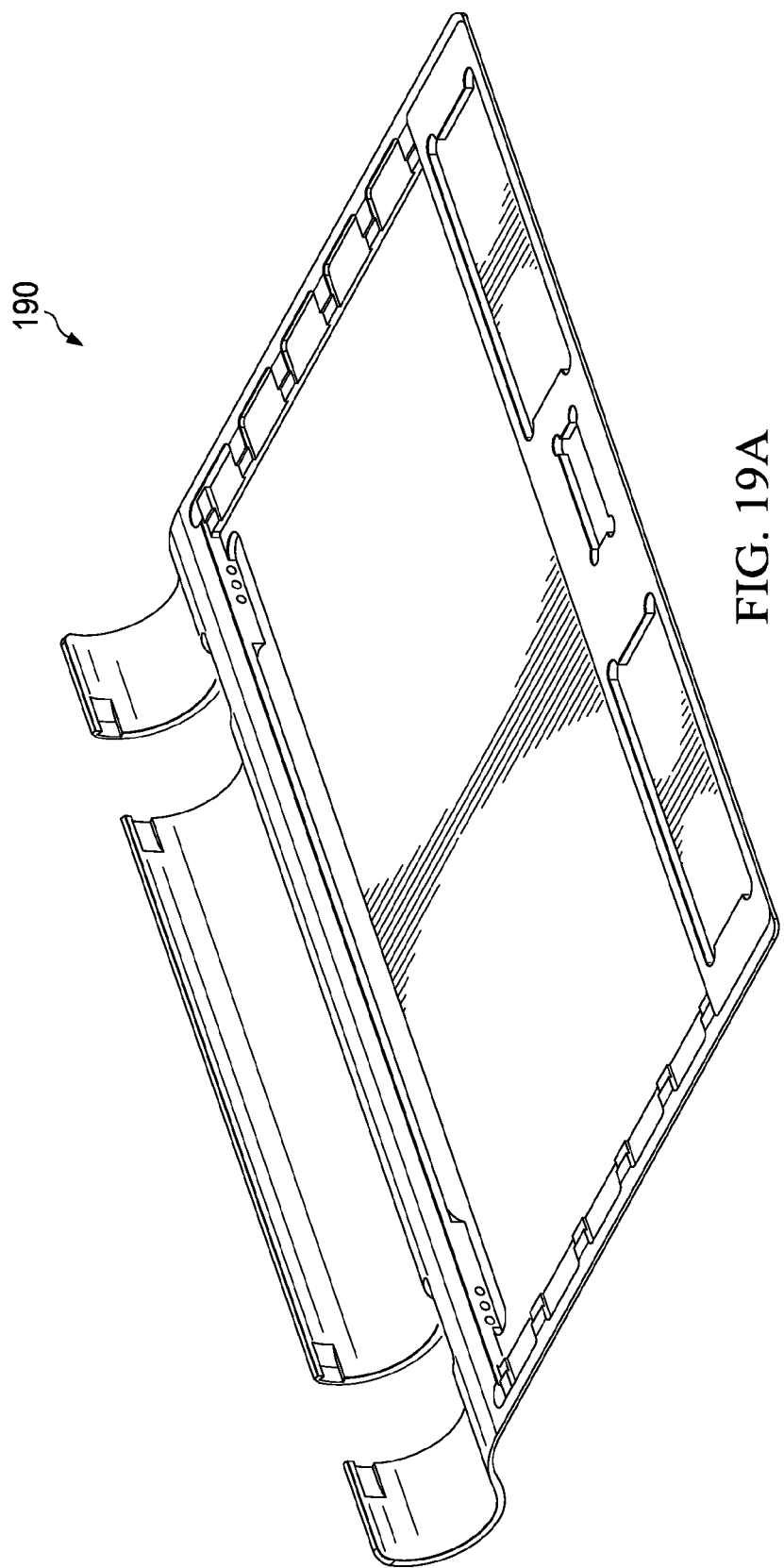
Figure 19B:
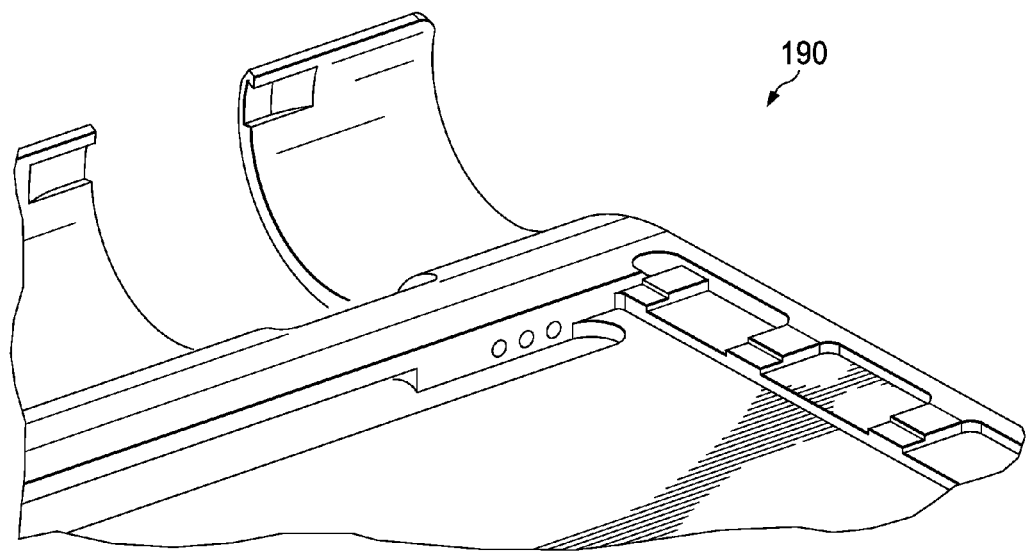
Figure 19C:
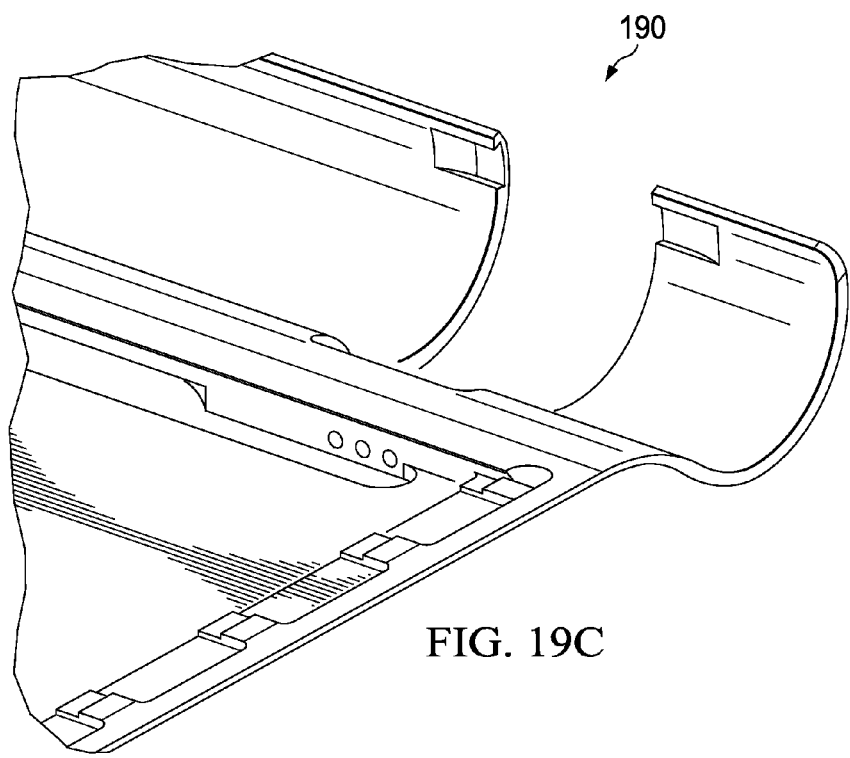

FIGS. 19A-19C are simplified schematic diagrams illustrating a potential arrangement associated with a keyboard body 190. In particular, FIG. 19A illustrates keyboard body 190 including an arc-shaped (e.g., scooped) design at a back end of keyboard body 190. Additionally, FIGS. 19B-C illustrate orthographic views associated with keyboard body 190.

FIG. 20 is a simplified schematic diagram illustrating an example keyboard assembly 200 that includes suitable coupling between the keyboard body and the keyboard layout.

Figure 21:
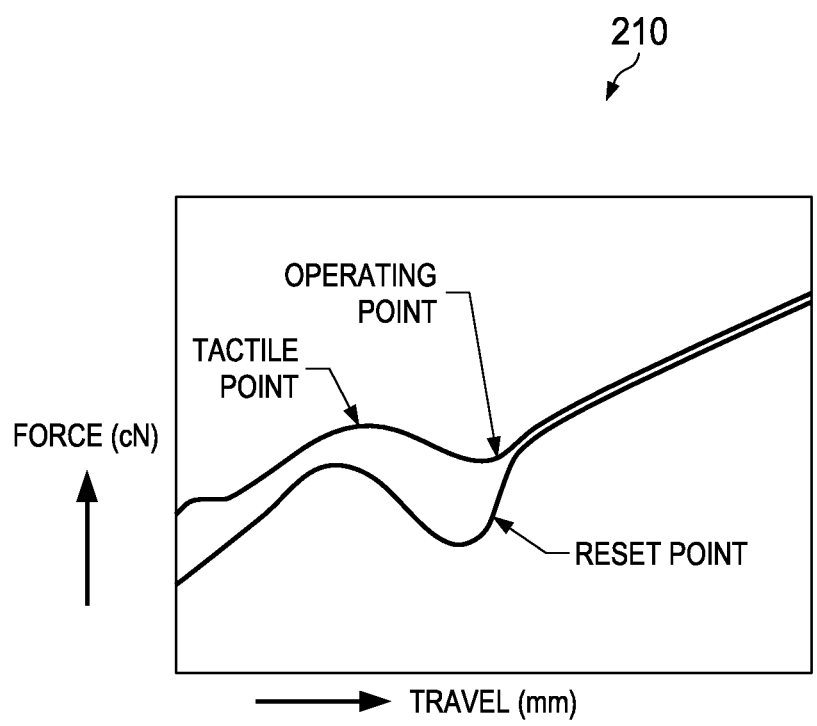
FIG. 21 is a simplified graph illustrating force as a function of key travel in an example keyboard scenario.

FIG. 21 is a simplified graph 210 illustrating force as a function of time in an example context associated with the keyboard design. In terms of the force profile, typical laptop and desktop keyboards have a force profile such that users can rest their fingers on the keys with only slight movement of the key. As the finger force increases, the key will remain near the top of its travel until a cliff force is reached. At that point, the key rapidly moves to the bottom of its stroke and triggers a keypress. In at least one example, once the tactile point is reached, the force drops and the key moves until the electric contact is made (i.e., the operating point).

In at least one example embodiment, magnets embedded in the outboard region of the keys can be attracted to a steel top plate. As the keypress force increases to the point of overcoming the magnetic attraction, the key is pushed away from the top plate and the magnetic attraction drops off significantly. In at least one embodiment, because there is no vertical movement until the cliff force is reached, that equates to a "free" 1.25 mm of travel indicated by a tactile point. This feature can offer the feeling of a larger travel than is actually present. When the push force is removed, the remaining magnetic force is sufficient to draw the key back to its resting position.

In certain designs, when the key reached the bottom of its stroke, the user could potentially feel a hard impact. To dampen the impact, conductive foam pads can be attached to each key. These conductive foam pads can also provide the electric signal of a keypress in a similar way that conductive pads on a membrane keyboard connect parallel traces on a flexible printed circuit. The center region of the keys can be free from obstructions, which can allow for optional backlighting of each key, or for particular key groupings.

Figure 22A:
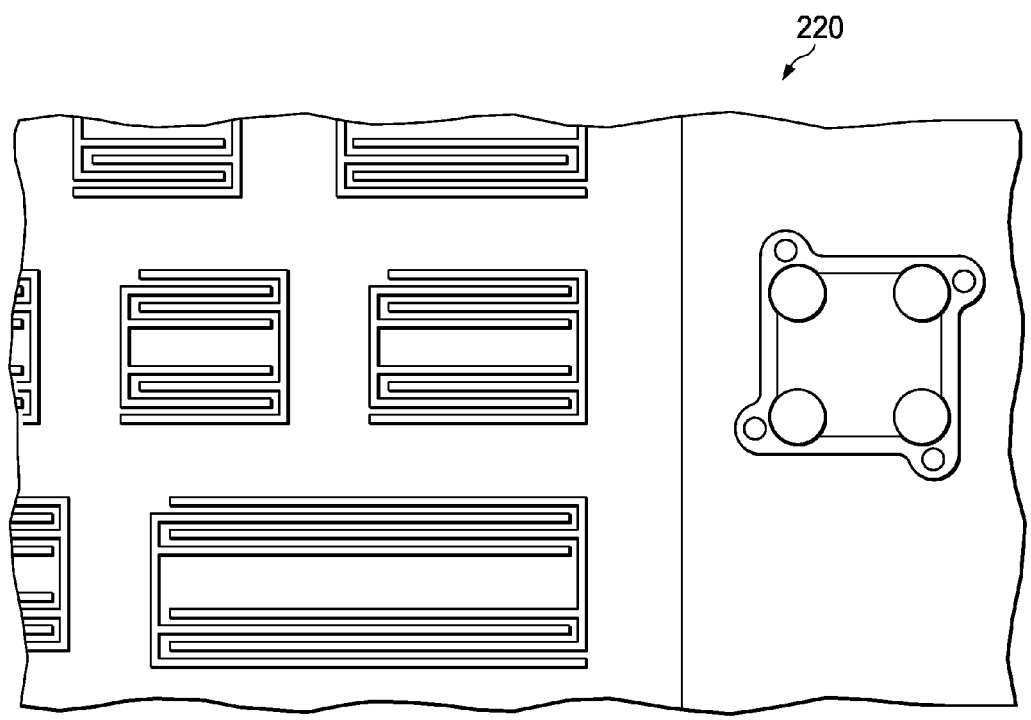
FIG. 22A is a simplified schematic diagram illustrating an example conductive bumper and flexible printed circuit traces for the keyboard.
Figure 23:
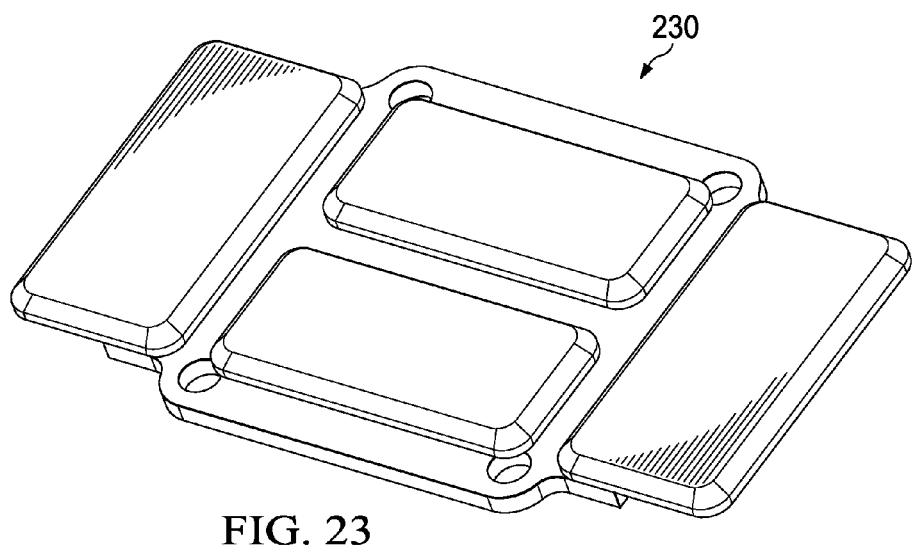
FIG. 23 is a simplified schematic diagram illustrating arrow keys associated with the keyboard of the present disclosure.
Figure 22B:
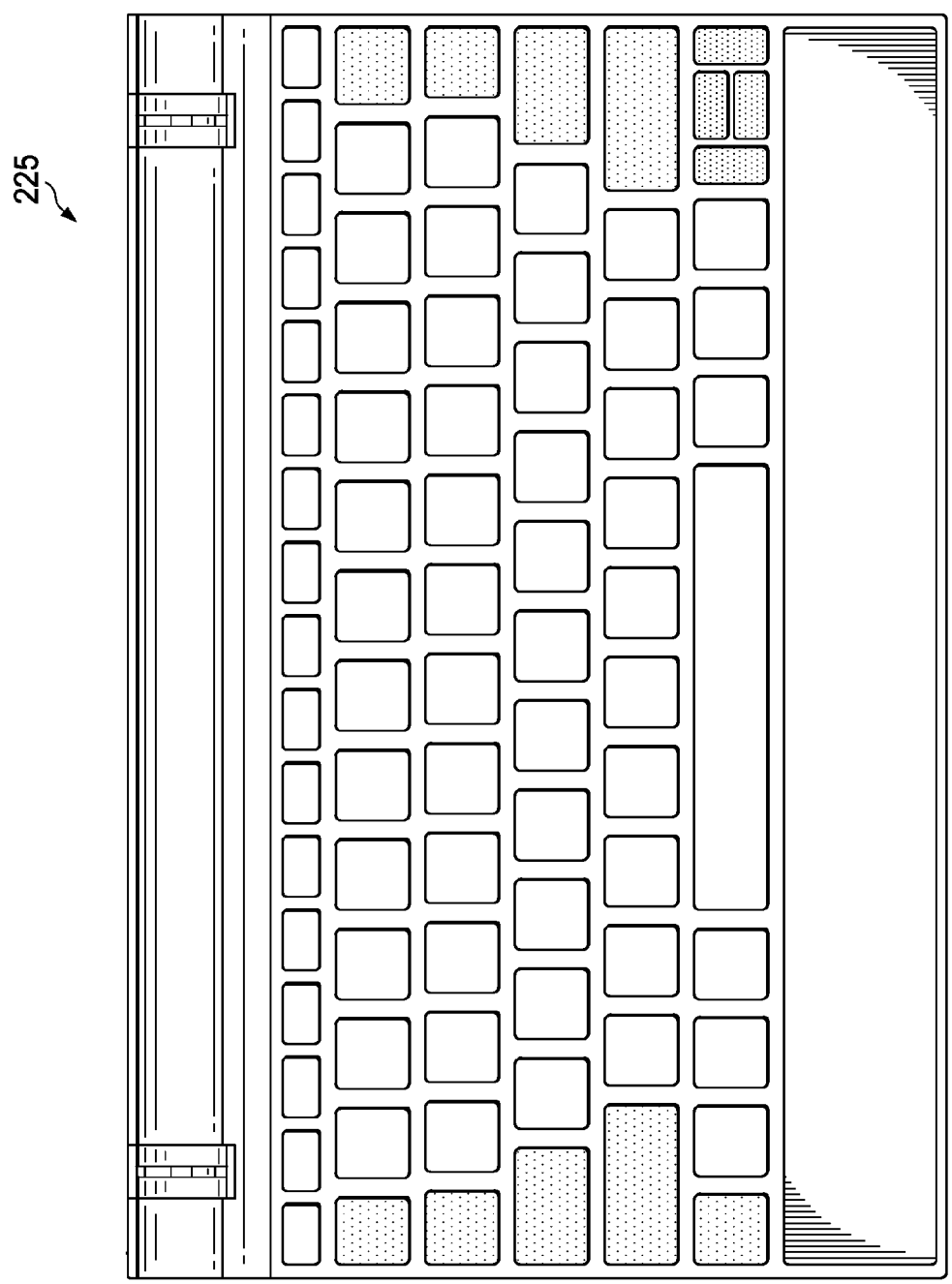
FIG. 22B is a simplified schematic diagram illustrating an example key layout for the keyboard.

FIG. 22A is a simplified schematic diagram illustrating example printed circuit board traces, along with a depiction of a key with conductive pads on its underside (generally indicated at an arrow 220). FIG. 22B is a simplified schematic diagram illustrating an example key layout 225 for the keyboard. FIG. 23 is a simplified schematic diagram illustrating arrow keys 230 associated with the keyboard of the present disclosure. In terms of providing pivoting keys versus free floating keys for keyboard 100, due to space constraints (e.g., imposed by the keyboard body shape), the keys along the side of the keyboard can pivot inward rather than simply moving vertically. The inboard-section of these keys has embedded magnets that are attracted to the top plate in the same fashion as the vertically travelling keys. The outboard part of these keys can rest on a shelf on the keyboard body: resulting in an inward-pivoting key motion.

The arrow keys can have a similar space constraint and have the additional constraint of reduced web material. This key set can be comprised of a single key assembly that also uses magnets that are attracted to the steel top plate, but the magnets are oriented such that the key assembly pivots about the two magnets farthest from the keypress location. For example, when the user presses the "Up" arrow, the key pivots about two of the magnets farthest from the "Up" arrow, and the conductive pad beneath the "Up" arrow contacts the FPC below. Likewise, when the user presses the "Right" arrow, the key pivots about two of the magnets (e.g., opposing the previous two magnets), and the conductive pad beneath the "Right" arrow contacts the FPC below.

Figure 24A:
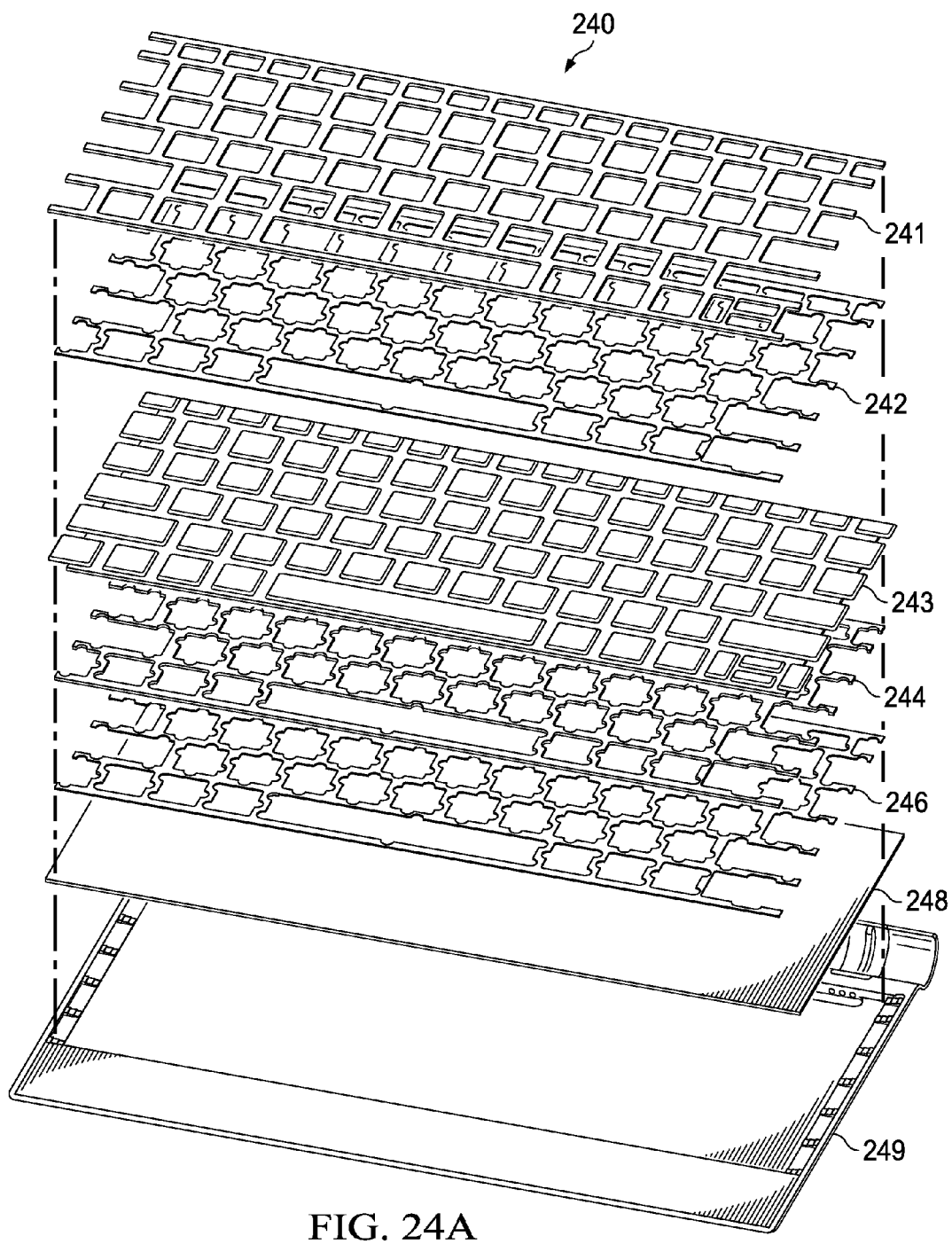
FIG. 24A is a simplified schematic diagram illustrating an example keyboard assembly.

FIG. 24A is a simplified schematic diagram illustrating an example keyboard assembly 240. Moving through each layer of this arrangement from top to bottom, this particular arrangement includes a steel top plate 241, a web-to-top plate adhesive 242, a plurality of keys 243, a web 244, a web-to-FPC adhesive 246, an adhesive-backed FPC 248, and a keyboard housing 249. In terms of the center web, in the absence of a scissor mechanism to guide the key motion, a center web can be designed with individual pockets for each key. Because the key travel is approximately 0.5 mm, the keys can travel substantially in the z-direction, and do not require a scissor mechanism to guide the motion. The result is that the key-tops remain nearly horizontal during the stroke. The center web, in conjunction with the steel top plate, can provide the main structural support for the thin-cross section molded plastic keyboard body. Each key can have magnets that extend outboard from the top/visible surface of the key. Because the space between keys is limited and the key magnets should extend outboard of the visible part of the key, the pattern of the center web cutouts can be designed to maximize remaining material in the web.

The steel plate of FIG. 24A can be laminated to the center web to provide additional structural support. It also can serve to attract the magnets embedded in the keys and can act as a cosmetic cover. To reduce flex in the plastic keyboard body beneath each key, the top of the FPC is laminated to the underside of the web, and the underside of the FPC is laminated to the inner floor of the keyboard body.

Figure 24B:
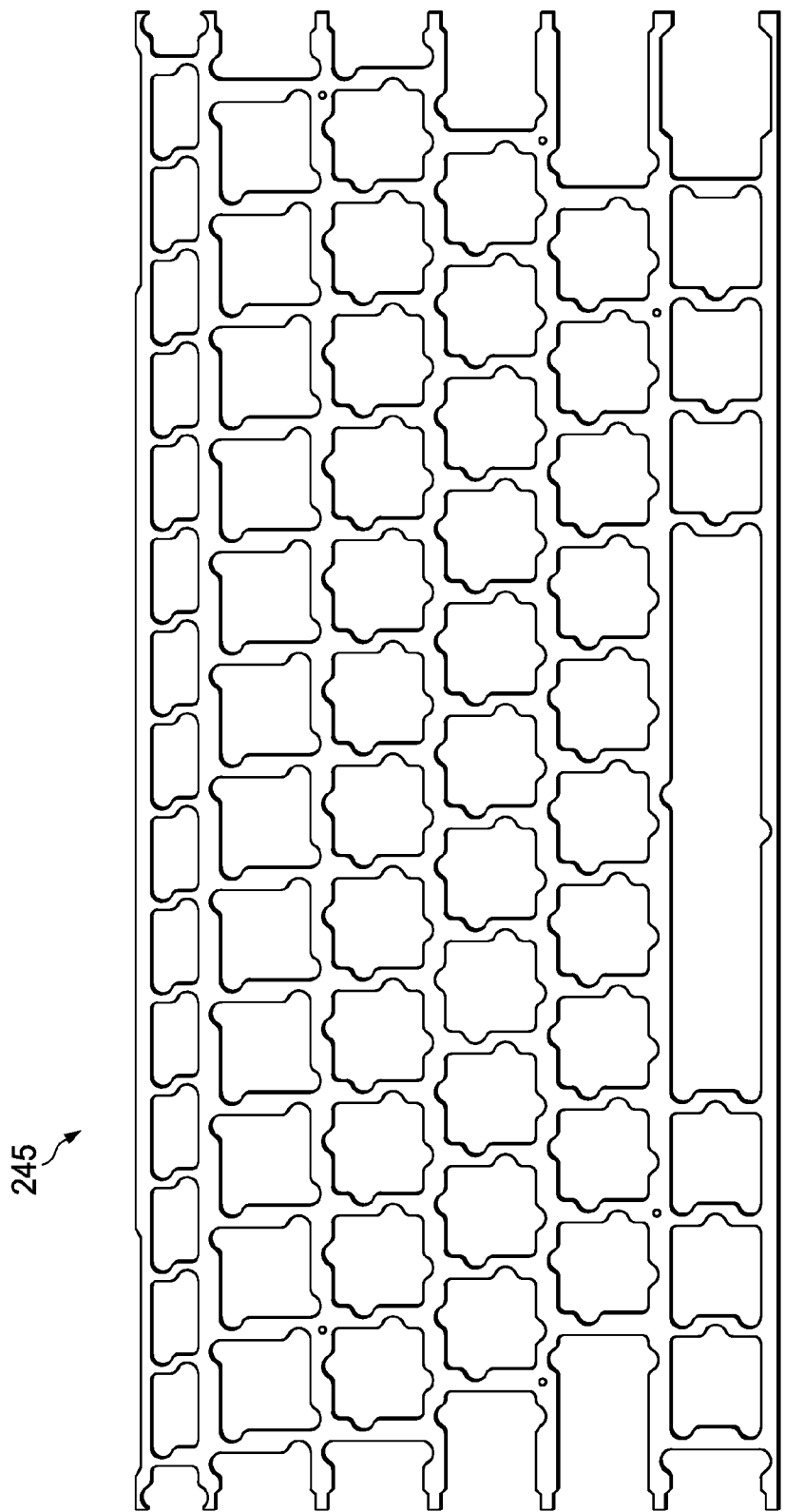
FIG. 24B is a simplified schematic diagram illustrating an example center web profile associated with the keyboard.
Figure 24C:
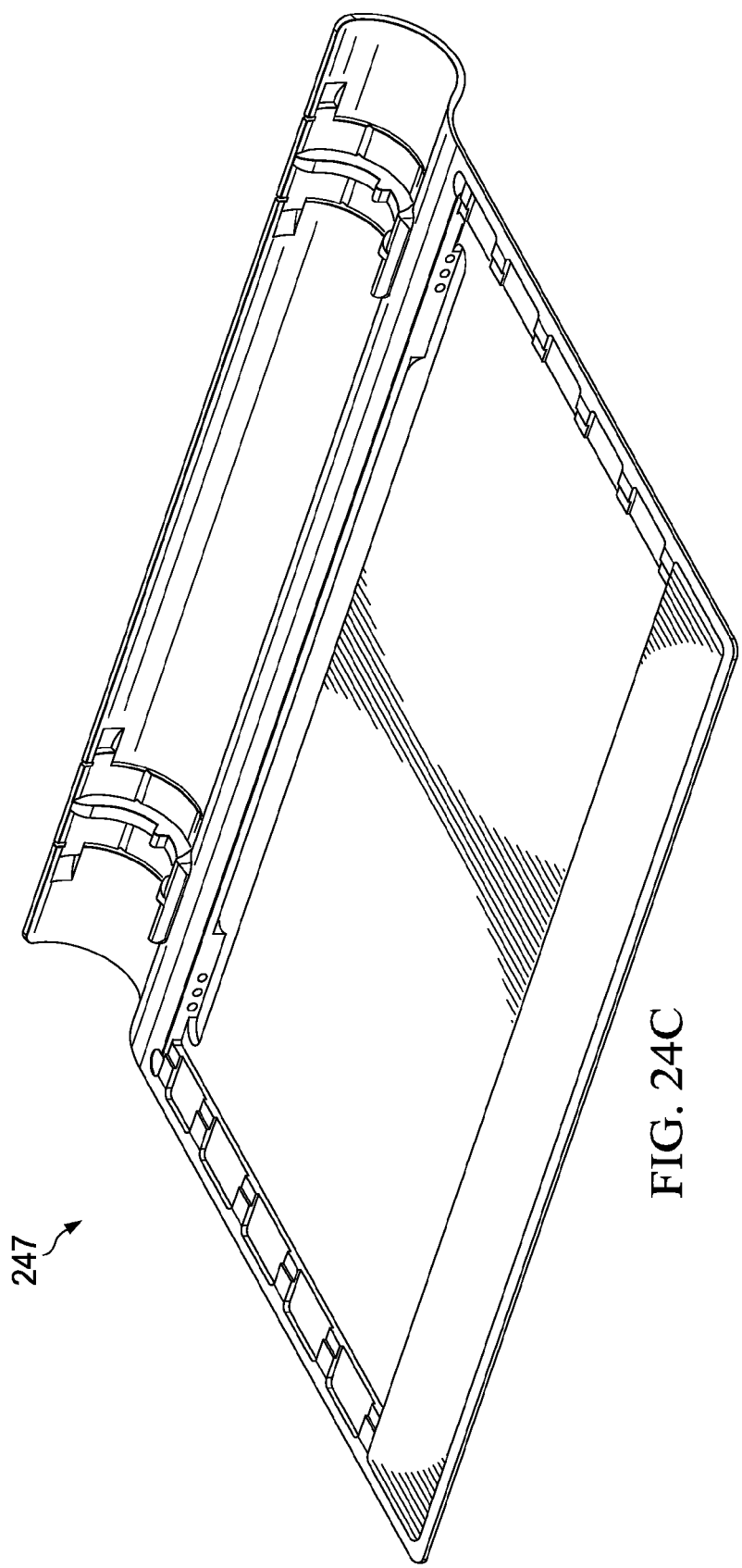
FIG. 24C is a simplified schematic diagram illustrating an example keyboard body and wrist pad configuration.

FIG. 24B is a simplified schematic diagram illustrating an example center web profile 245 associated with the keyboard, as discussed above. FIG. 24C is a simplified schematic diagram illustrating an example keyboard body and wrist pad configuration 247. Beneath the wrist pad shown below, three rare earth magnets with alternating polarity are mounted with a steel back plate to reduce unwanted magnetic fields emanating below the keyboard. The latch magnets can attract a steel snap plate mounted in the tablet. The steel back plate can concentrate the magnetic field from the latch magnets and direct them upward toward the tablet to help keep the device closed. The latch magnet can be designed to have an equal closing force when the device is in laptop mode and notebook mode.

Figure 25A:
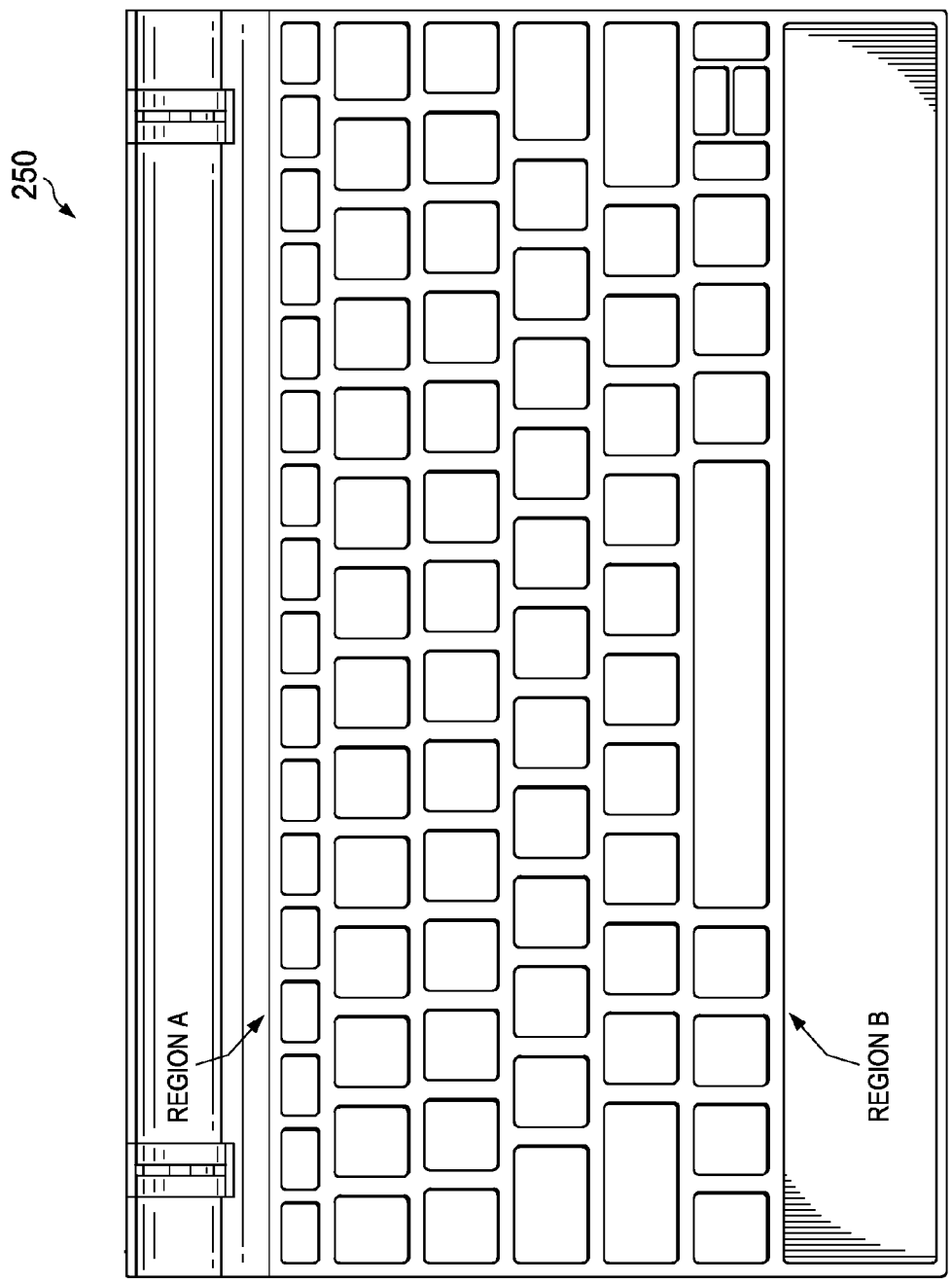
FIG. 25A is a simplified schematic diagram associated with one embodiment of the keyboard.

FIG. 25A is a simplified schematic diagram associated with another embodiment of a keyboard configuration 250. This particular design of the keyboard is different from the previously discussed designs. The stiffness of the main body of the keyboard in the area of the web is stiff as previously discussed; however, the transition from the scoop to the web (Region A) and the transition from the web to the wrist plate (Region B) are regions that can be further enhanced. Certain issues can be accounted for due to transitions in material properties. This can involve the scoop to web transition stiffness (Region A). When the user opens or closes the device, torque is transmitted from the clutch mechanism of the tablet to the bands and through the keyboard. Because the web/top plate are stiffer than the plastic surrounding the bands, a bending moment causes flex in the plastic and concentrates stress at that transition. In particular scenarios, during the opening process, this bending manifests itself in the appearance of the web/top plate peeling off the keyboard body. To reduce this effect, the upper region of the web/top plate can be extended beneath the plastic near the band.

To address the web to wrist pad transition stiffness (Region B), in a similar manner as the scoop to web transition, there is a material stiffness discontinuity, where the web section transitions to the wrist pad area. This region of the keyboard is less crowded with other components, and so a simple solution of extending part of the web to the region beneath the wrist plate can allow for a more continuous material stiffness transition and, further, reduce the concentration of stresses. (FIG. 25B illustrates a web outline to help reduce keyboard stress concentrations.)

Figure 25B:
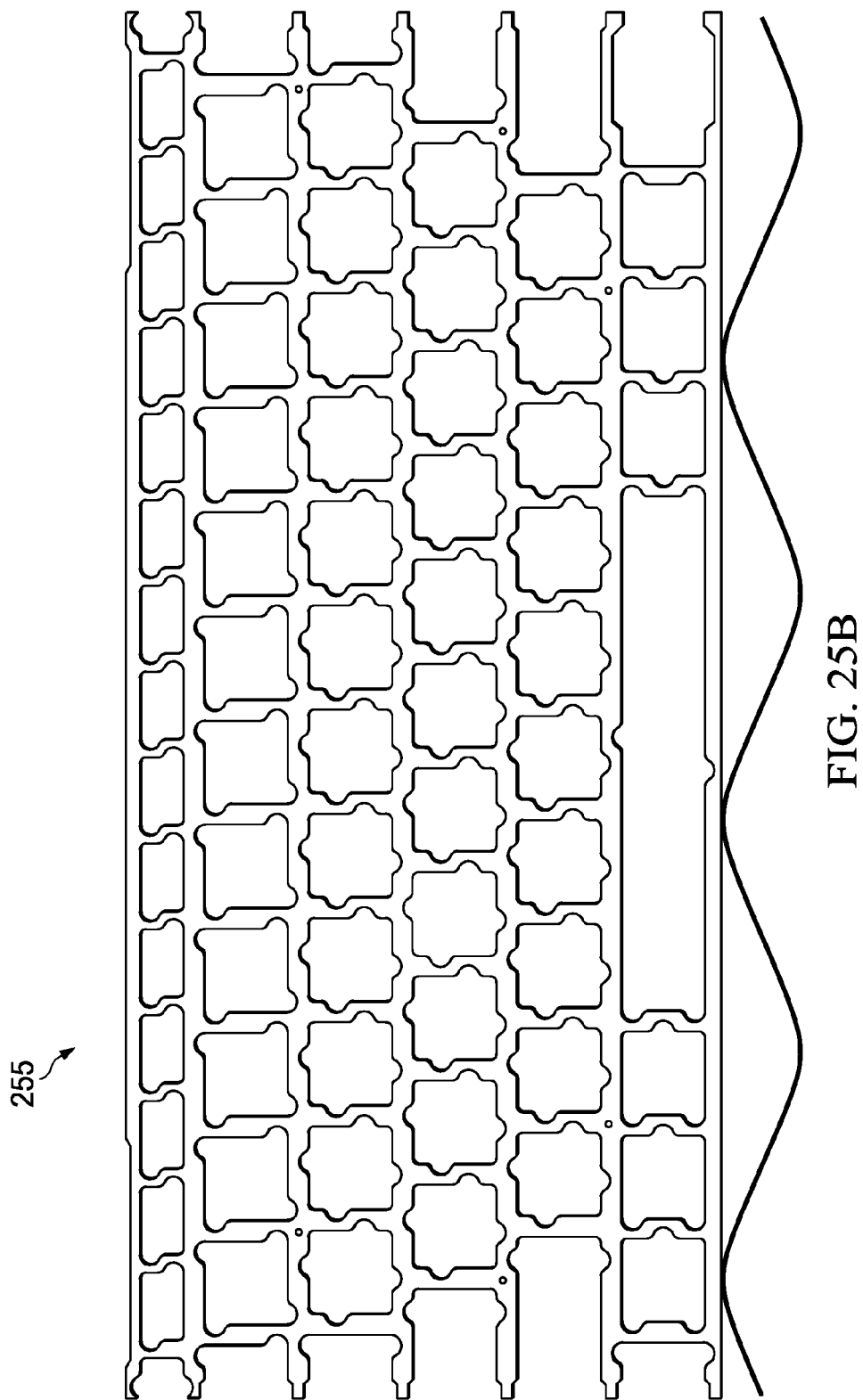
FIG. 25B is a simplified schematic diagram illustrating a web shape associated with the keyboard body.

FIG. 25B is a simplified schematic diagram illustrating a web shape 255 associated with the keyboard body. In particular, a wavy web shape indicated by the depicted curve reduces the stress concentration at the transition between the web and the wrist pad in the keyboard body. In certain cases, the latch magnet can have a weaker pull force than expected in the laptop mode. Hence, the latch magnet design can be altered to increase the holding force when the device is in laptop mode, while keeping the pull force the same in tablet mode. To accomplish this functionality, a new magnet configuration and tablet-side snap plate can be implemented. Thinner and longer magnets can be embedded in the keyboard in alternating polarity with a steel back-plate to reduce stray magnetic fields. In the tablet configuration, the single snap plate can be replaced by a magnet plus a snap plate configuration such that when the device is in the laptop mode, the keyboard magnets attract magnets in the tablet, and when the device is in tablet mode, the keyboard magnets attract the snap plate in the tablet.

Figure 25C:
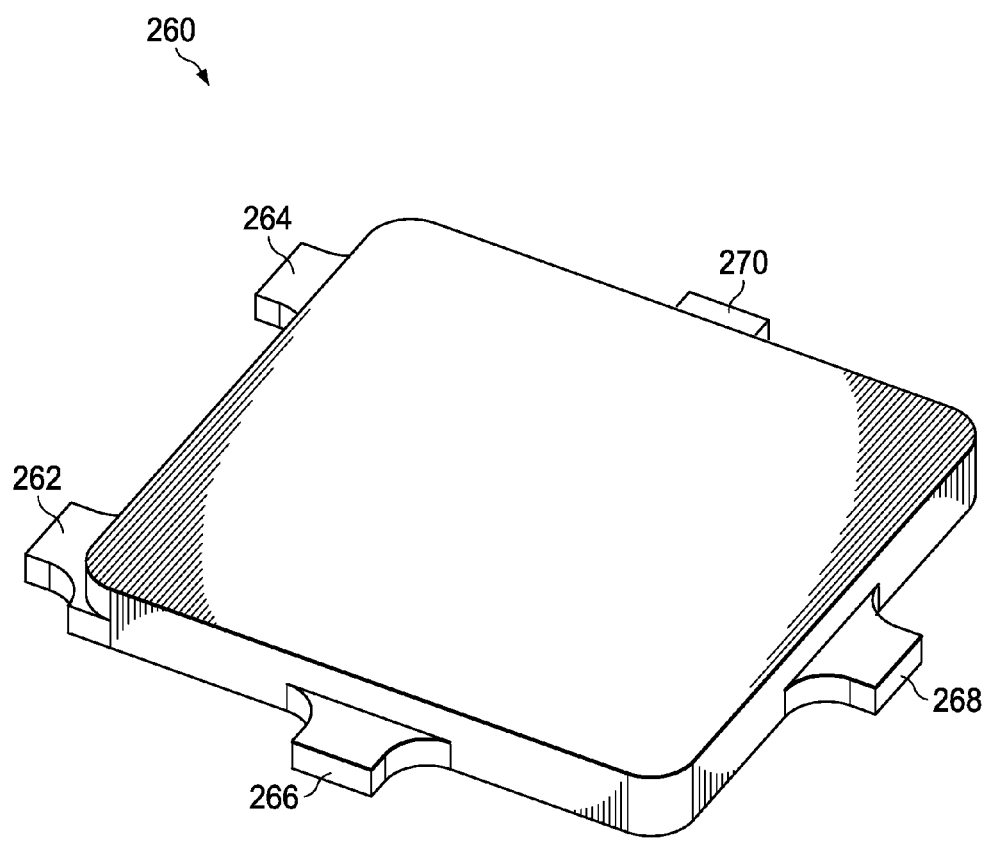
FIG. 25C is a simplified schematic diagram illustrating an individual key having retaining tabs that live beneath a top structure associated with a magnetic repulsive keyboard assembly.
Figure 25D:
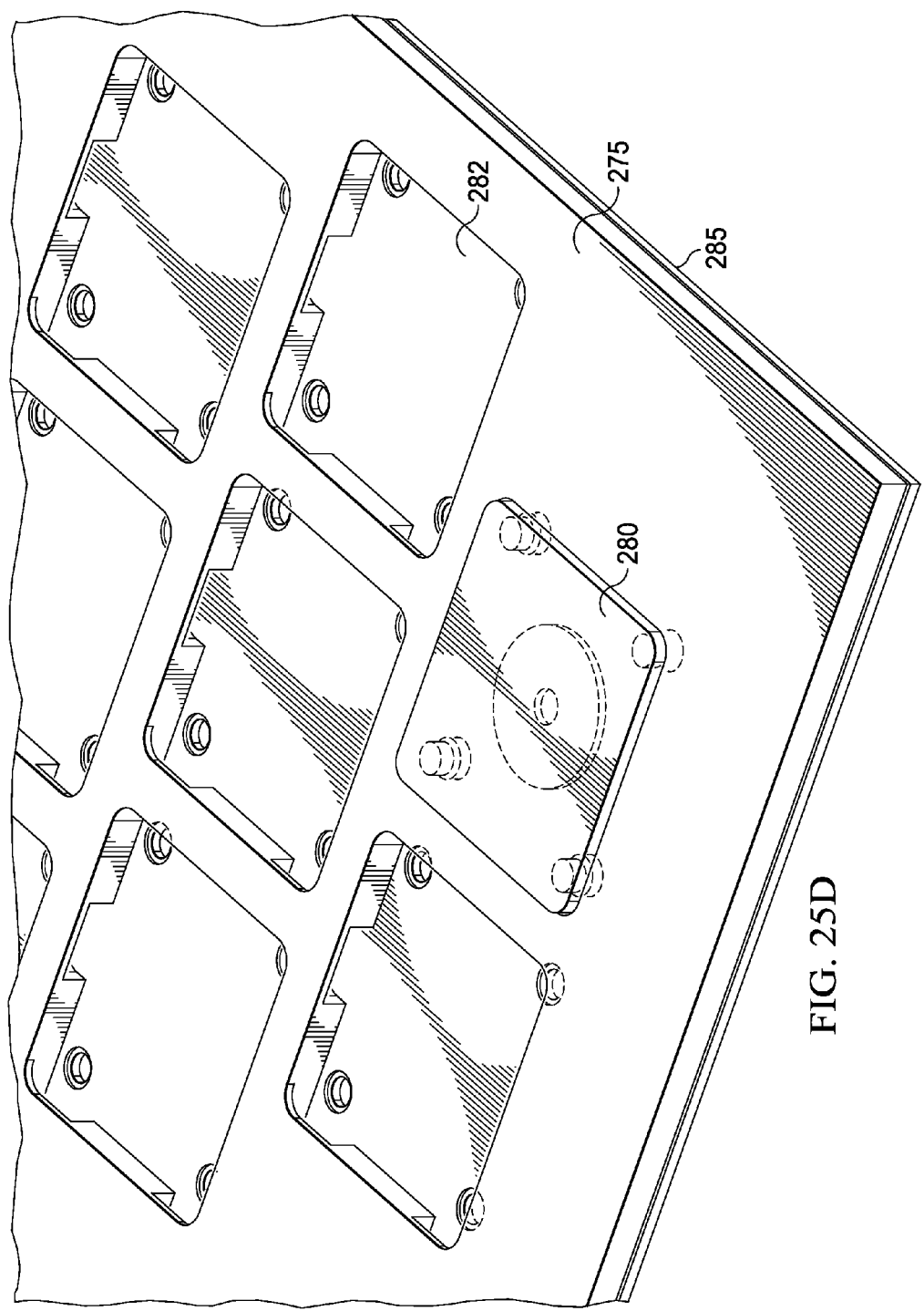
FIG. 25D is a simplified schematic diagram illustrating an example layout associated with the magnetic repulsive keyboard assembly.

FIG. 25C is a simplified schematic diagram illustrating an individual key 260 having retaining tabs 262-270 that live beneath a top structure associated with a magnetic repulsive keyboard assembly. FIG. 25D is a simplified schematic diagram illustrating an example layout associated with the magnetic repulsive keyboard assembly. Note that because of their relationship, these two FIGURES are discussed together. In the illustration of FIG. 25D, a magnetic repulsive keyboard assembly includes a single key 280 being populated. Key 280 has four magnets provided in (or fixed on) it, where in this particular instance, the magnets lie within a footprint of the key top. There are also four magnets provided into a base plate 285, which is mostly covered by an FPC 282. In a particular embodiment, the polarity of the magnets in the key is opposite to that of the magnets embedded in the base plate. This can have the effect of perpetually biasing the keys upward. To prevent falling out of the keyboard, the keys can be retained by tabs that extend outboard of the key top and into pockets in the web. In the center of the key, there can be a single conductive bumper or a plurality of conductive bumpers that can complete the circuit of traces on the FPC.

In the illustration of FIG. 25C, the individual key includes multiple retaining tabs that live beneath a top structure of the keyboard assembly. In this embodiment, the top structure can provide keyboard structural stiffness, translational and rotational restraint, as well as restraining the keys from falling out. In a particular implementation, a steel top plate and an aluminum web (from the magnetic attraction keyboard) can be combined into a single piece. Alternatively, instead of using conductive bumpers to complete the circuit triggering a keypress, another embodiment can replace conductive bumpers with dome switches or other elements. In both cases, the magnetic repulsive nature of the key can bias the key upward, but these two concepts illustrate just two (of the many) methods that could trigger a keypress.

Figure 26:
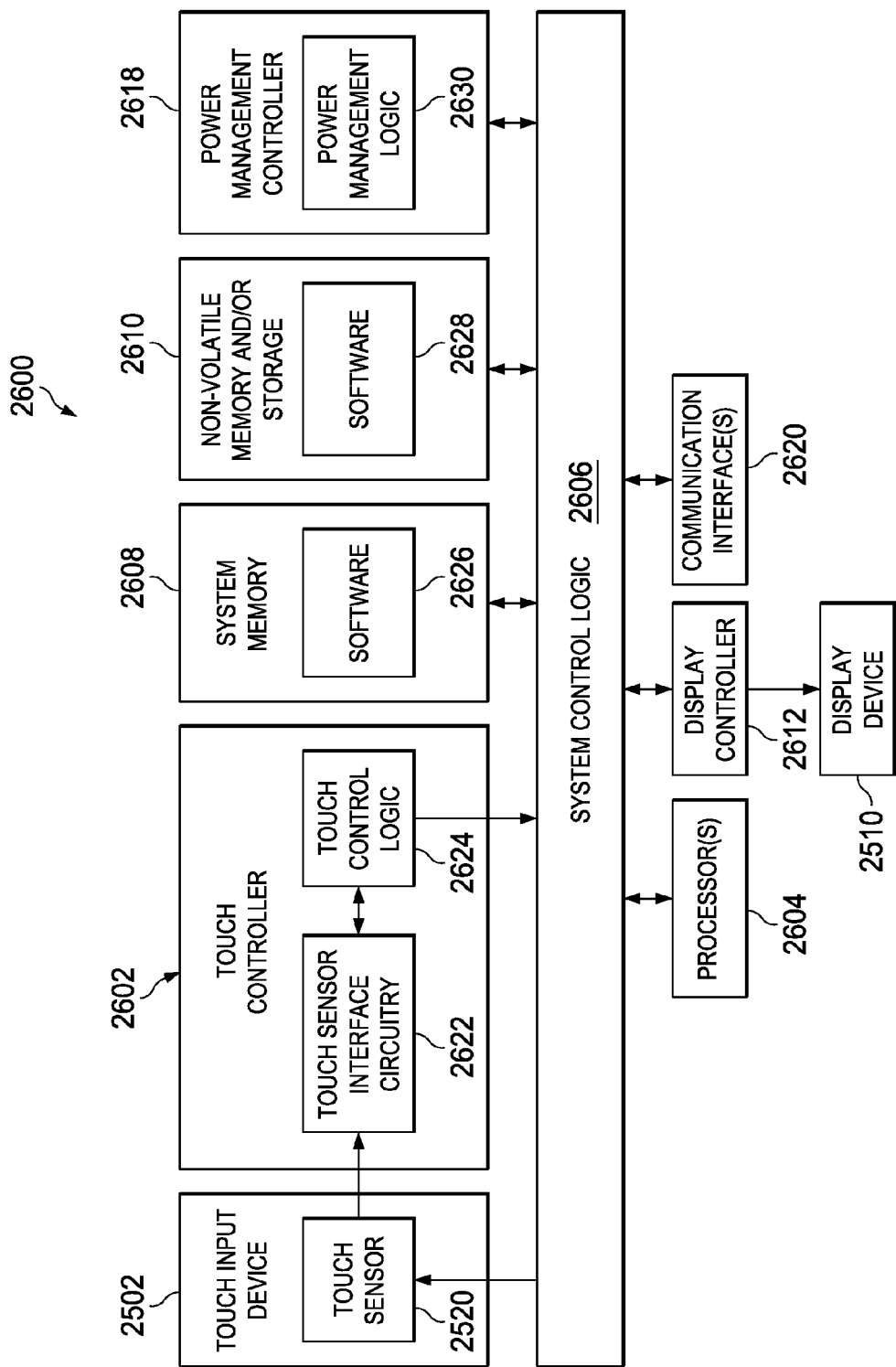
FIG. 26 is a simplified block diagram illustrating potential electronics associated with the electronic device.

FIG. 26 is a simplified block diagram illustrating potential electronics associated with electronic device 10. More particularly, FIG. 26 illustrates an embodiment of an example system 2600 that may be included in any portion (or shared by portions) of electronic device 10. System 2600 includes a touch input device 2502, a touch controller 2602, one or more processors 2604, system control logic 2606 coupled to at least one of processor(s) 2604, system memory 2608 coupled to system control logic 2606, non-volatile memory and/or storage device(s) 2610 coupled to system control logic 2606, display controller 2612 coupled to system control logic 2606, display controller 2612 coupled to a display, power management controller 2618 coupled to system control logic 2606, and communication interfaces 2620 coupled to system control logic 2606.

Touch input device 2502 includes touch sensor 2520 and each may be implemented using any suitable touch-sensitive technology such as, for example and without limitation, capacitive, resistive, surface acoustic wave (SAW), infrared, and optical imaging. Touch input device 2502, in a particular embodiment, may be implemented using any suitable multi-touch technology.

System control logic 2606, in a particular embodiment, may include any suitable interface controllers to provide for any suitable interface to at least one processor 2604 and/or to any suitable device or component in communication with system control logic 2606. System control logic 2606, in a particular embodiment, may include one or more memory controllers to provide an interface to system memory 2608. System memory 2608 may be used to load and store data and/or instructions, for example, for system 2600. System memory 2608, in a particular embodiment, may include any suitable volatile memory, such as suitable dynamic random access memory (DRAM) for example. System control logic 2606, in a particular embodiment, may include one or more input/output (I/O) controllers to provide an interface to a display device, touch controller 2602, and non-volatile memory and/or storage device(s) 2610.

Non-volatile memory and/or storage device(s) 2610 may be used to store data and/or instructions, for example within software 2628. Non-volatile memory and/or storage device(s) 2610 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 2618 includes power management logic 2630 configured to control various power management and/or power saving functions of electronic device 10 based upon whether electronic device 10 is in an open configuration or a closed configuration and/or a physical orientation of electronic device 10. In at least one embodiment, power management controller 2618 is configured to reduce the power consumption of components or devices of system 2600 that may either be operated at reduced power or turned off when electronic device 10 is in the closed configuration. For example, in a particular embodiment when electronic device 10 is in a closed configuration, power management controller 2618 may perform one or more of the following: power down the unused portion of the display and/or any backlight associated therewith; allow one or more of processor(s) 2604 to go to a lower power state if less computing power is required in the closed configuration; and shutdown any devices and/or components, such as keyboard 108, that are unused when electronic device 10 is in the closed configuration.

Communications interface(s) 2620 may provide an interface for system 2600 to communicate over one or more networks and/or with any other suitable device. Communications interface(s) 2620 may include any suitable hardware and/or firmware. Communications interface(s) 2620, in a particular embodiment, may include, for example, a network adapter, a wireless network adapter, a telephone modem, and/or a wireless modem.

System control logic 2606, in a particular embodiment, may include one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For one embodiment, at least one processor 2604 may be packaged together with logic for one or more controllers of system control logic 2606. In at least one embodiment, at least one processor 2604 may be packaged together with logic for one or more controllers of system control logic 2606 to form a System in Package (SiP). In at least one embodiment, at least one processor 2604 may be integrated on the same die with logic for one or more controllers of system control logic 2606. For a particular embodiment, at least one processor 2604 may be integrated on the same die with logic for one or more controllers of system control logic 2606 to form a System on Chip (SoC).

For touch control, touch controller 2602 may include touch sensor interface circuitry 2622 and touch control logic 2624. Touch sensor interface circuitry 2622 may be coupled to detect touch input over a first touch surface layer and a second touch surface layer of display 26 (i.e., display device 2510). Touch sensor interface circuitry 2622 may include any suitable circuitry that may depend, for example, at least in part on the touch-sensitive technology used for touch input device 2502. Touch sensor interface circuitry 2622, in at least one embodiment, may support any suitable multi-touch technology. Touch sensor interface circuitry 2622, in at least one embodiment, may include any suitable circuitry to convert analog signals corresponding to a first touch surface layer and a second surface layer into any suitable digital touch input data. Suitable digital touch input data for one embodiment may include, for example, touch location or coordinate data.

Touch control logic 2624 may be coupled to help control touch sensor interface circuitry 2622 in any suitable manner to detect touch input over a first touch surface layer and a second touch surface layer. Touch control logic 2624 for one embodiment may also be coupled to output in any suitable manner digital touch input data corresponding to touch input detected by touch sensor interface circuitry 2622. Touch control logic 2624 may be implemented using any suitable logic, including any suitable hardware, firmware, and/or software logic (e.g., non-transitory tangible media), that may depend, for example, at least in part on the circuitry used for touch sensor interface circuitry 2622. Touch control logic 2624 for one embodiment may support any suitable multi-touch technology.

Touch control logic 2624 may be coupled to output digital touch input data to system control logic 2606 and/or at least one processor 2604 for processing. At least one processor 2604 for one embodiment may execute any suitable software to process digital touch input data output from touch control logic 2624. Suitable software may include, for example, any suitable driver software and/or any suitable application software. As illustrated in FIG. 26, system memory 2608 may store suitable software 2626 and/or non-volatile memory and/or storage device(s).

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense. It should also be noted that the terms 'electronic device' and 'tablet' have been used interchangeably herein in this document.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation, a system may include means for receiving a keypress for at least one of a plurality of keys of a keyboard assembly, where at least some of the plurality of keys include certain keys having respective magnets that are embedded at substantially outer portions of the certain keys. Additionally, the system may include means for generating a magnetic field for attracting the certain keys to a top plate, which comprises ferrous material; and means for registering an electrical contact for the keypress.

In at least one example embodiment, the system may also include means for guiding vertical movement for the plurality of keys; and means for preventing rotational movement for the plurality of keys. The keyboard assembly may include a web structure that comprises nonferrous material. The web structure can define a number of openings through which movement of the plurality of the keys is constrained. The keyboard assembly further comprises a keyboard housing coupled to the web structure.

What is claimed is:
1. A keyboard assembly, comprising:
  a first plurality of keys that includes a key having one or more magnets that are provided at at least one outer edge of a lower portion of the key, wherein a portion of each of the one or more magnets extend beyond the outer edge of the lower portion of the key;
  a second plurality of keys including one or more edge keys provided along at least a section of a perimeter of the keyboard assembly, wherein at least one edge key of the one or more edge keys includes an inboard portion having one or more magnets provided at an outer edge of the at least one edge key, and wherein the at least one edge key includes an outboard portion extending from the inboard portion and beyond an edge of a support base of the keyboard assembly and having no magnets provided in the outboard portion of the at least one key;
  and a top plate that comprises a ferrous material to attract the one or more magnets of the first plurality of keys and the second plurality of keys to the top plate.

2. The keyboard assembly of claim 1, further comprising:
  a web structure that is to guide vertical movement for at least some of the plurality of keys, and wherein the web structure is to prevent rotational movement for at least some of the plurality of keys.

3. The keyboard assembly of claim 2, wherein the web structure comprises nonferrous material.

4. The keyboard assembly of claim 1, further comprising:
  a web structure that defines a number of openings to constrain movement of at least some of the plurality of the keys.

5. The keyboard assembly of claim 1, further comprising:
a keyboard housing to provide a rigidity characteristic to the keyboard assembly.

6. The keyboard assembly of claim 5, wherein the keyboard housing comprises a metal material that is integrated into a plastic material.

7. The keyboard assembly of claim 1, wherein the plurality of keys includes a group of keys, wherein at least one of the group of keys is configured to pivot in a downward direction about an axis, which is provided in between at least some of the group of keys.

8. The keyboard assembly of claim 1, wherein at least some of the plurality of keys are biased upward with one or more electrically conductive pads.

9. The keyboard assembly of claim 1, wherein the top plate is provided above at least one side of at least some of the plurality of keys.

10. The keyboard assembly of claim 1, further comprising:
a battery storage unit that is to receive a battery for providing a power supply to an electronic device to which the keyboard assembly is to be attached.

11. The keyboard assembly of claim 1, wherein electrical contact is registered for a keypress for the key in response to a depression force of at least 70 grams being applied to the key.

12. The keyboard assembly of claim 1, wherein one or more of the magnets are to create a magnetic force toward the top plate such that the key is returned to its original position after a keypress.

13. A keyboard assembly, comprising:
a first plurality of keys;
a second plurality of keys;
a top plate; and
one or more magnets to create a magnetic field to position a respective key of the plurality of keys, wherein at least one key of the first plurality of keys includes the one or more magnets provided at at least one outer edge of a lower portion of the key, and wherein a portion of each of the one or more magnets extend beyond the outer edge of the lower portion of the key, wherein the second plurality of keys includes one or more edge keys provided along at least a section of a perimeter of the keyboard assembly, wherein at least one edge key of the one or more edge keys includes an inboard portion having one or more magnets provided at an outer edge of the at least one edge key, and wherein the at least one edge key includes an outboard portion extending from the inboard portion and beyond an edge of a support base of the keyboard assembly and having no magnets provided in the outboard portion of the at least one key.

14. The keyboard assembly of claim 13, wherein the one or more magnets create an attractive force between the one or more magnets and a ferrous material of the top plate.

15. The keyboard assembly of claim 13, wherein the plurality of keys includes a group of keys, wherein at least one of the group of keys is configured to pivot in a downward direction about an axis, which is provided in between at least some of the group of keys.

16. A method, comprising: providing a keyboard assembly including a first plurality of keys and a second plurality of keys, wherein at least one key of the first plurality of keys has one or more magnets that are provided at at least one outer edge of a lower portion of the key, wherein a portion of each of the one or more magnets extend beyond the outer edge of the lower portion of the key, wherein the second plurality of keys includes one or more edge keys provided along at least a section of a perimeter of the keyboard assembly, wherein at least one edge key of the one or more edge keys includes an inboard portion having one or more magnets provided at an outer edge of the at least one edge key, and wherein the at least one edge key includes an outboard portion extending from the inboard portion and beyond an edge of a support base of the keyboard assembly and having no magnets provided in the outboard portion of the at least one key; and
attracting the one or more magnets to a top plate that comprises a ferrous material.

17. The method of claim 16, further comprising:
guiding vertical movement for at least some of the plurality of keys via a web structure that is to prevent rotational movement for at least some of the plurality of keys.

18. The method of claim 17, wherein the web structure comprises nonferrous material.

19. The method of claim 16, wherein a web structure defines a number of openings to constrain movement of at least some of the plurality of the keys.

20. The method of claim 16, wherein the plurality of keys includes a group of keys, wherein at least one of the group of keys is configured to pivot in a downward direction about an axis, which is provided in between at least some of the group of keys.

21. The method of claim 16, wherein the plurality of keys include one or more keys that are each configured to pivot about a respective axis in response to a depression force being applied to the one or more keys.

22. The method of claim 16, wherein at least some of the first plurality of keys are biased upward with one or more electrically conductive pads.

23. The method of claim 16, wherein the top plate is to be provided above at least one side of at least some of the first plurality of keys.

24. The method of claim 16, wherein electrical contact is registered for a keypress for the key in response to a depression force of at least 70 grams being applied to the key.

25. The method of claim 24, further comprising:
displaying a result for the keypress at a display.

26. The method of claim 24, further comprising:
registering an electrical contact for the keypress.

27. A system, comprising:
a keyboard assembly including a first plurality of keys and a second plurality of keys, wherein at least one key of the first plurality of keys has one or more magnets that are provided at at least one outer edge of a lower portion of the key, wherein a portion of each of the one or more magnets extend beyond the outer edge of the lower portion of the key, wherein the second plurality of keys includes one or more edge keys provided along at least a section of a perimeter of the keyboard assembly, wherein at least one edge key of the one or more edge keys includes an inboard portion having one or more magnets provided at an outer edge of the at least one edge key, and wherein the at least one edge key includes an outboard portion extending from the inboard portion and beyond an edge of a support base of the keyboard assembly and having no magnets provided in the outboard portion of the at least one key; and
means for positioning the one or more magnets toward a top plate.

28. The system of claim 27, further comprising:
means for guiding vertical movement for at least some of a plurality of keys and preventing rotational movement for at least some of the plurality of keys.

29. The system of claim 27, wherein the keyboard assembly includes a web structure that comprises nonferrous material.

30. The system of claim 27, further comprising:
means for constraining movement of at least some of a plurality of the keys.

31. The system of claim 27, further comprising:
means for housing at least some of the keyboard assembly.

32. The system of claim 27, wherein the plurality of keys include one or more keys that are each configured to pivot about a respective axis in response to a depression force being applied to the one or more keys.

33. The system of claim 27, wherein at least some of the first plurality of keys are biased upward with one or more electrically conductive pads that are to trigger a keypress.

34. The system of claim 27, further comprising:
means for displaying a result for a keypress of the key.

35. The system of claim 27, further comprising:
means for registering an electrical contact for a keypress of the key.

36. A system, comprising:
a processor;
a display;
a first plurality of keys;
a second plurality of keys; and
one or more magnets to create a magnetic field to position a respective key of the plurality of keys, wherein at least one key of the first plurality of keys includes the one or more magnets provided at at least one outer edge of a lower portion of the key, and wherein a portion of each of the one or more magnets extend beyond the outer edge of the lower portion of the key, wherein the second plurality of keys includes one or more edge keys provided along at least a section of a perimeter of the keyboard assembly, wherein at least one edge key of the one or more edge keys includes an inboard portion having one or more magnets provided at an outer edge of the at least one edge key, and wherein the at least one edge key includes an outboard portion extending from the inboard portion and beyond an edge of a support base of the keyboard assembly and having no magnets provided in the outboard portion of the at least one key.

37. The system of claim 36, wherein the one or more magnets create an attractive force between the one or more magnets and a ferrous material of a top plate.

38. The system of claim 36, wherein the plurality of keys includes a group of keys, wherein at least one of the group of keys is configured to pivot in a downward direction about an axis, which is provided in between at least some of the group of keys.

* * * * *